(12) United States Patent
Ogata et al.

(10) Patent No.: US 9,608,753 B2
(45) Date of Patent: Mar. 28, 2017

(54) TIME SYNCHRONIZATION SYSTEM, MANAGEMENT NODE, AND TIME SYNCHRONIZATION METHOD

(71) Applicant: HITACHI, LTD., Tokyo (JP)

(72) Inventors: Yuji Ogata, Tokyo (JP); Masaki Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 14/367,092

(22) PCT Filed: Dec. 27, 2012

(86) PCT No.: PCT/JP2012/083806
§ 371 (c)(1),
(2) Date: Jun. 19, 2014

(87) PCT Pub. No.: WO2013/100019
PCT Pub. Date: Jul. 4, 2013

(65) Prior Publication Data
US 2014/0348186 A1 Nov. 27, 2014

(30) Foreign Application Priority Data

Dec. 28, 2011 (JP) ................................ 2011-287909

(51) Int. Cl.
*H04J 3/06* (2006.01)
*H04L 29/14* (2006.01)
(Continued)

(52) U.S. Cl.
CPC .......... *H04J 3/0676* (2013.01); *H04J 3/0641* (2013.01); *H04L 7/0016* (2013.01);
(Continued)

(58) Field of Classification Search
None
See application file for complete search history.

(56) References Cited

U.S. PATENT DOCUMENTS 6,078,595 A * 6/2000 Jones ................. H04Q 11/0421
370/219
6,098,178 A * 8/2000 Moretti ..................... G06F 1/14
713/500
(Continued)

FOREIGN PATENT DOCUMENTS

EP    2 362 585 A1    8/2011
JP    2007-310522 A   11/2007
(Continued)

OTHER PUBLICATIONS

International Search Report and Written Opinion issued in International Application No. PCT/JP2012/083806, mailed Mar. 19, 2013.

*Primary Examiner* — Gregory Sefcheck
*Assistant Examiner* — Rina Pancholi
(74) *Attorney, Agent, or Firm* — Mattingly & Malur, PC

(57) ABSTRACT

A time synchronization system comprises a time master, a time slave, and a management node which are coupled to one another via a plurality of networks. The time master transmits to the time slave a time packet at a given timing through at least one of the plurality of networks. The time slave has a time correcting part for receiving the time packet transmitted from the time master and for correcting time based on the received time packet. The management node has: a network switching determining part for determining whether to switch the network for transmitting a time packet to another of the plurality of networks; and a network switching notifying part for notifying, in a case where it is determined that the network for transmitting the time packet is to be switched, information for identifying the switched-to network to the time slave.

10 Claims, 17 Drawing Sheets

(51) Int. Cl.
*H04L 29/06* (2006.01)
*H04L 7/00* (2006.01)
*H04L 29/08* (2006.01)

(52) U.S. Cl.
CPC ............ *H04L 67/125* (2013.01); *H04L 69/28* (2013.01); *H04L 69/40* (2013.01); *H04J 3/0658* (2013.01); *H04J 3/0667* (2013.01)

(56) References Cited

U.S. PATENT DOCUMENTS

| | | | | |
|---|---|---|---|---|
| 6,804,542 | B1* | 10/2004 | Haartsen | H04W 52/0229 340/7.38 |
| 8,700,805 | B2* | 4/2014 | Na | H04W 56/0015 375/354 |
| 2009/0147806 | A1* | 6/2009 | Brueckheimer | H04J 3/0667 370/503 |
| 2010/0296524 | A1* | 11/2010 | Rahbar | H04J 3/0661 370/516 |
| 2011/0019698 | A1* | 1/2011 | Akae | H04J 3/0664 370/509 |
| 2011/0205886 | A1 | 8/2011 | Maruyama et al. | |
| 2013/0208735 | A1* | 8/2013 | Mizrahi | H04J 3/0661 370/503 |
| 2013/0223458 | A1* | 8/2013 | Bui | H04J 3/0658 370/503 |

FOREIGN PATENT DOCUMENTS

| | | |
|---|---|---|
| JP | 2009-077207 A | 4/2009 |
| JP | 2011-082858 A | 4/2011 |
| JP | 2011-135482 A | 7/2011 |
| JP | 2011-176718 A | 9/2011 |

\* cited by examiner

| | 71 | 72 | 73 | 74 | 75 611 |
|---|---|---|---|---|---|
| NETWORK NAME | UTILIZATION STATUS | DELAY MEDIAN | JITTER MEDIAN | JITTER TOLERANCE |
| WIDE AREA NETWORK #1 | IN USE | 10ms | 20μs | ±10μs |
| WIDE AREA NETWORK #2 | NOT IN USE | 50ms | 1000μs | ±100μs |
| ... | ... | ... | ... | ... |

*Fig. 4*

| | 71 | 72 | 73 | 76 | 77 611 |
|---|---|---|---|---|---|
| NETWORK NAME | UTILIZATION STATUS | DELAY MEDIAN | MINIMUM JITTER VALUE | MAXIMUM JITTER VALUE |
| WIDE AREA NETWORK #1 | IN USE | 10ms | 10μs | 30μs |
| WIDE AREA NETWORK #2 | NOT IN USE | 50ms | 900μs | 1100μs |
| ... | ... | ... | ... | ... |

*Fig. 5*

| | 81 | 82 | 83 | 84 | 85 | 86 609 |
|---|---|---|---|---|---|---|
| NETWORK NAME | MEAN DELAY | MEAN JITTER | JITTER STANDARD DEVIATION | TIME PACKET ARRIVAL COUNT | TIME CORRECTION CANCELLATION COUNT |
| WIDE AREA NETWORK #1 | 13ms | 24μs | 1.41 | 300 TIMES | 3 TIMES |
| WIDE AREA NETWORK #2 | 53ms | 1030μs | 100 | 300 TIMES | 150 TIMES |
| ... | ... | ... | ... | ... | ... |

*Fig. 6*

--Prior Art--

--Prior Art--

--Prior Art--

TIME SYNCHRONIZATION SYSTEM, MANAGEMENT NODE, AND TIME SYNCHRONIZATION METHOD

INCORPORATE BY REFERENCE

The present application claims priority from Japanese patent application JP 2011-287909 filed on Dec. 28, 2011, the content of which is hereby incorporated by reference into this application.

BACKGROUND OF THE INVENTION

This invention relates to a time synchronization system including a time master and a time slave, and more particularly, to a time synchronization system in which a time slave corrects time managed by the time slave itself based on a time packet transmitted from a time master.

Application fields of information and telecommunication networks are expanding with the increase in the area and speed of information and telecommunication networks. Hitherto, systems that utilize a geographically limited information and telecommunication network have been built. Today, large-scale systems utilizing a wide area information and telecommunication network which is not geographically limited are being explored. A known example of such systems is energy management systems such as a smart grid system.

Large-scale systems that utilize a wide area information and telecommunication network demand enhanced reliability from the network. A technology for enhancing network reliability that is being explored involves accurately synchronizing time that is managed by a time slave with time that is managed by a time master by transmitting a time packet from the time master through the network.

For instance, IEEE 1588 v2 is a technology for synchronizing time on the order of microseconds. FIG. 19 is an explanatory diagram of the basic principle of IEEE 1588 v2. A time synchronization system in IEEE 1588 v2 includes a time master for transmitting a time packet and a time slave, which is coupled to the time master via a network, for receiving the time packet. The network through which the time packet is communicated is constructed of a switch that has a transparent clock function. The transparent clock function is a function of relaying a packet after including in the packet the length of time required to transmit the packet within the switch.

FIG. 20 is a sequence diagram illustrating a communication sequence according to the basic time synchronization algorithm of IEEE 1588. The time master and the time slave hold two-way communication to synchronize the time of the time slave with the time of the time master.

The time master periodically transmits a Sync message to the time slave. The time master records a time T1 at which the Sync message has been transmitted (hereinafter referred to as "Sync transmission time"). The time master next transmits a Follow_up message to the time slave. When transmitting the Follow_up message, the time master stores the Sync transmission time T1 in the Follow_up message.

The time slave receives the Sync message and, with processing of receiving this as a trigger, records a time T2 at which the Sync message has been received (hereinafter referred to as "Sync reception time"). The time slave next receives the Follow_up message, and extracts and records the Sync transmission time T1 stored in the Follow_up message. The time slave then transmits a Delay_Request message to the time master. The time slave records a time T3 at which the Delay_Request message has been transmitted (hereinafter referred to as "Delay transmission time").

The time master receives the Delay_Request message and, with processing of receiving this as a trigger, records a time T4 at which the Delay_Request message has been received (hereinafter referred to as Delay reception time"). The time master next transmits a Delay_Response message to the time slave. When transmitting the Delay_Response message, the time master stores the Delay reception time T4 in the Delay_Response message.

The time slave receives the Delay_Response message, and extracts and records the Delay reception time T4 stored in the Delay_Response message. Based on the Sync transmission time T1 and the Sync reception time T2, the time slave calculates a differential MS_Diff between time at the time master (hereinafter referred to as "master time") and time at the time slave (hereinafter referred to as "slave time") by the following Expression 1.

$$MS\_Diff = T2 - T1 \qquad \text{Expression 1}$$

The time slave also obtains a differential between the slave time and the master time based on the Delay transmission time T3 and the Delay reception time T4 by the following Expression 2.

$$SM\_Diff = T4 - T3 \qquad \text{Expression 2}$$

A delay in one way between the time master and the time slave (Delay) is obtained next with the use of MS_Diff and SM_Diff and the following Expression 3.

$$Delay = (MS\_Diff + SM\_Diff)/2 \qquad \text{Expression 3}$$

The slave time is modified next by obtaining a time offset of the time slave with respect to the time master (Offset) by the following Expression 4.

$$Offset = MS\_Diff - Delay = ((T2-T1) - (T4-T3))/2 \qquad \text{Expression 4}$$

The premise of the calculation method described above is that the network transmission delay time is constant.

On the other hand, when there are fluctuations in transmission delay between the time master and the time slave and fluctuations in queuing delay which occurs in a relay node in the network, a more accurate network transmission delay time needs to be measured in order to obtain a higher synchronization precision. This is why a switch used to build a time synchronization network has a transparent clock function as illustrated in FIG. 21. FIG. 21 is a sequence diagram illustrating a communication sequence according to a time synchronization algorithm of a system that includes a switch with a transparent clock function that conforms to IEEE 1588 v2. The switch with the transparent clock function transfers time packets after including the lengths of delays caused in the switch, namely, a delay time T5–T4, a delay time T7–T6, a delay time T9–T8, and a delay time T11–T10, in the time packets. This enables the time slave to take into account the length of delay caused in the switch when correcting time.

To build a time synchronization network as this, all switches used to build the network need to have a transparent clock function. Most switches already disposed in a network, on the other hand, do not have a transparent clock function. Replacing the switches or adding a function to the switches is therefore required, which increases the cost and labor of building a time synchronization network. A method aimed to solve this problem is known which involves having a communication node measure its own delay amount by a simple method and correcting time (see JP 2011-135482 A, for example).

In another known method for enhancing the precision of time synchronization, a time slave measures network jitters so that switches used to build a time synchronization network do not need to have special means and, when the measured jitters are outside a jitter tolerance range which is set in advance, does not correct time (see JP 2009-077207 A, for example).

JP 2009-077207 A also discloses that, when statistical processing of network jitters measured by the time slave reveals a significant variation in jitters, switching of networks path used for time synchronization is detected.

SUMMARY OF THE INVENTION

A problem of the method disclosed in JP 2009-077207 A is that, because the time slave needs to receive a time packet a plurality of times before detecting switching of network paths and cannot detect switching of network paths immediately after the switching, the precision of time synchronization drops for that duration.

Another problem of the method of JP 2009-077207 A is that switching of network paths cannot be detected unless jitters vary greatly between the switched-from network path and the switched-to network path.

An object of this invention to provide a time synchronization system that uses a plurality of networks that executes an appropriate time correction even immediately after switching of networks by minimizing the time required for a time slave to detect switching of networks.

According to an aspect of the present invention, there is provided a time synchronization system, comprising a time master, a time slave, and a management node which are coupled to one another via a plurality of networks, wherein the time master transmits to the time slave a time packet at a given timing through at least one of the plurality of networks, wherein the time slave has a time correcting part for receiving, through the at least one of the plurality of networks, the time packet transmitted from the time master and for correcting time based on the received time packet, and wherein the management node has: a network switching determining part for determining whether to switch the network for transmitting a time packet to another of the plurality of networks; and a network switching notifying part for notifying, in a case where it is determined that the network for transmitting the time packet is to be switched, information for identifying the switched-to network to the time slave.

An effect of the exemplary embodiment of the invention disclosed herein is summarized as follows. This invention enables to provide a time synchronization system that uses a plurality of networks that executes an appropriate time correction even immediately after switching of networks by minimizing the time required for a time slave to detect switching of networks.

BRIEF DESCRIPTION OF THE DRAWINGS

The present invention can be appreciated by the description which follows in conjunction with the following figures, wherein:

FIG. 4 is an explanatory diagram of a threshold table according to the first embodiment of this invention;

FIG. 5 is an explanatory diagram of a modification example of the threshold table according to the first embodiment of this invention;

FIG. 6 is an explanatory diagram of an operation value table according to the first embodiment of this invention;

DETAILED DESCRIPTION OF THE PREFERRED EMBODIMENTS

First Embodiment

A first embodiment of this invention is described below with reference to FIGS. 1 to 13.

A time synchronization system of this embodiment is a time synchronization system utilizing a wide area network that couples a plurality of bases to one another. The time synchronization system includes a management node for transmitting a network switching notification to a time slave when a network to which a time master transmits a time packet is switched to another network. This enables the time slave to quickly detect that networks have been switched.

Figure 1:
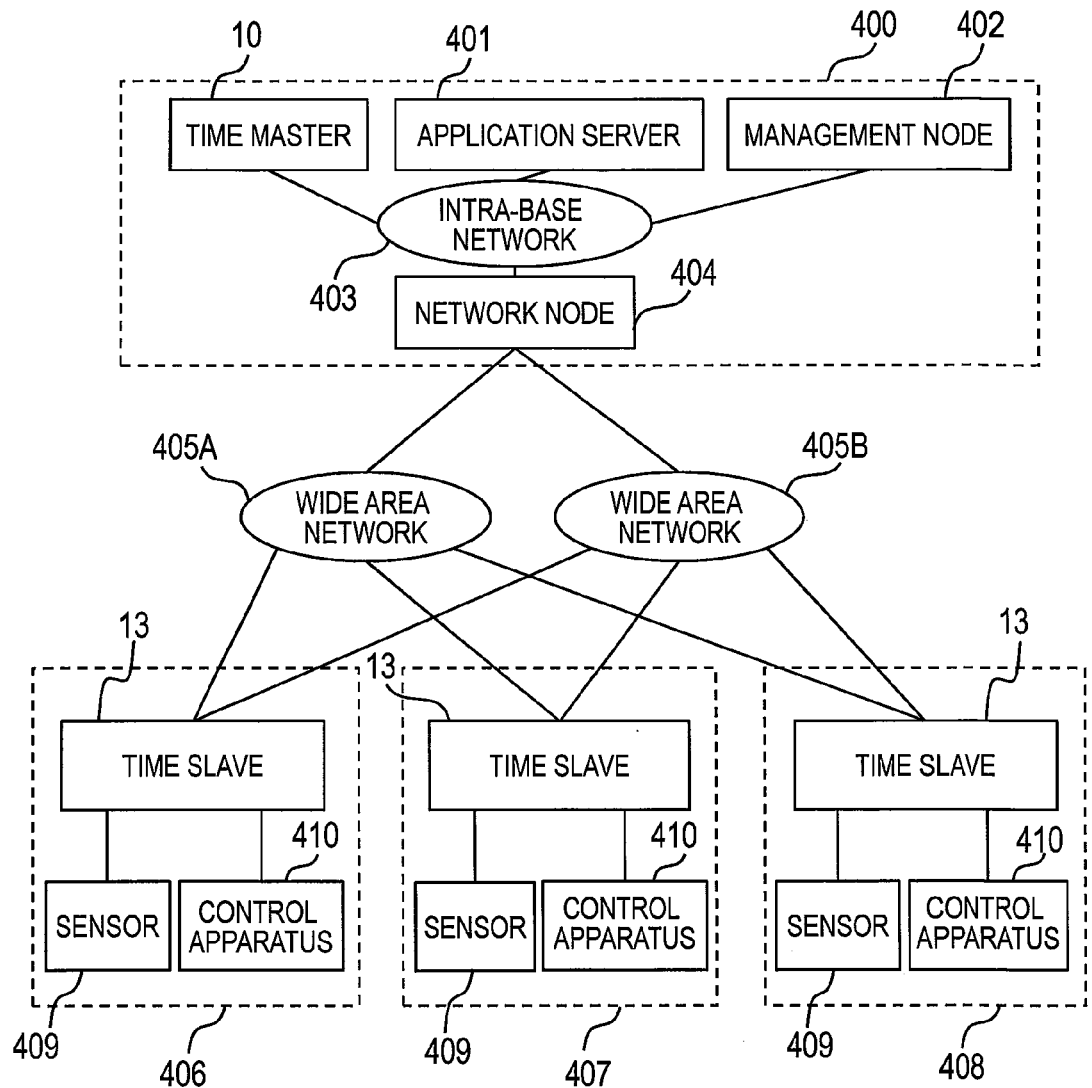
FIG. 1 is an explanatory diagram of a configuration of a time synchronization system according to a first embodiment of this invention.

FIG. 1 is an explanatory diagram of the configuration of the time synchronization system according to the first embodiment of this invention.

In the time synchronization system, a control base 400 where a time master 10 is disposed is coupled to bases 406 to 408 where time slaves 13 are disposed by wide area networks 405A and 405B (hereinafter the wide area networks 405A and 405B are collectively referred to as wide area networks 405).

The time master 10, an application server 401, a management node 402, and a network node 404 are disposed in the control base 400. The network node 404 is coupled to the wide area networks 405. The time master 10, the application server 401, the management node 402, and the network node 404 are coupled to one another via an intra-base network 403.

The time master 10 periodically transmits a time packet to the time slaves 13 through the wide area networks 405. The application server 401 is a computer for executing an application. The management node 402 is a computer for managing the wide area networks 405 which are used by the time master 10 to transmit a time packet. The network node 404 is a router or a switch that has a communication function.

The application server 401 collects, via the time slaves 13 and the wide area networks 405, various types of data detected by sensors 409, which are described later. The application server 401 saves the collected various types of data, or executes computing processing based on the various types of data.

One of the time slaves 13, one of the sensors 409, and a control apparatus 410 are disposed in the base 406. The sensor 409 and the control apparatus 410 are connected to the time slave 13 by a wired or wireless communication line.

The time slave 13 is a network node coupled to one of the wide area networks 405, and is a sophisticated network node which has a determining processing function and a computing processing function in addition to a communication function. The time slave 13 has a function of counting time, and synchronizes in time with the time master 10 by receiving a time packet from the time master 10. The time slave 13 also monitors data detected by the sensor 409, and executes computing processing on the data. The time slave 13 further executes processing related to the control apparatus 410.

A time packet that the time slave 13 receives is delayed by a transmission delay time of the wide area network 405 that is used for the transmission of the time packet. The transmission delay time varies each time the time slave 13 receives a time packet. The variations in transmission delay time are called transmission delay time fluctuations (jitters). The transmission delay time fluctuations cause a time synchronization error for the time slave 13. In other words, when the transmission delay time of a time packet is too great, the time slave 13 cannot synchronize with the time of the time master 10 in some cases despite correcting time based on the time packet.

A jitter threshold for determining whether to correct time is therefore set to the time slave 13 of this embodiment for each wide area network 405. When jitters of a time packet are within the threshold, the time slave 13 corrects time based on the time packet.

In this embodiment, the time slave 13 manages the threshold for each wide area network 405 used for the transmission of a time packet and changes, based on the used network switching notification which is sent from the management node 402, the threshold used to determine whether to correct time. Whether to correct time can thus be determined with the use of a threshold associated with the switched-to wide area network 405, even immediately after the wide area networks 405 are switched.

In this embodiment, the time slave 13 stores an operation value related to a time packet that has actually been received by the time slave 13, and the management node 42 reads the operation value to determine whether or not the threshold is appropriate based on the read operation value. The propriety of the threshold can thus be examined.

The sensor 409 and the control apparatus 410 are apparatus that utilize time counted by the time slave 13. The sensor 409 refers collectively to various mechanisms for converting temperature, voltage value, and other types of physical information into a signal, such as a temperature sensor, a humidity sensor, a vibration sensor, a pressure sensor, a human presence sensor, a microphone, and a camera. The control apparatus 410 refers collectively to various mechanisms for converting an input signal into physical movement, such as an alarm apparatus, an opening and closing switch, and a motor.

The time slave 13 does not always need to be connected to the sensor 409 and the control apparatus 410, and it is sufficient if some apparatus that utilizes time counted by the time slave 13 is connected to the time slave 13.

The time slave 13 is disposed in each of the bases 406 to 408 in the description above. Instead of disposing one time slave 13 in the bases 406 to 408 each, a room-by-room basis, a floor-by-floor basis, or a building-by-building basis placement may be employed depending on the processing performance of the time slave 13.

The counts of the time slaves 13, the sensors 409, the control apparatus 410, and the wide area networks 405 are not limited to those in FIG. 1.

Figure 2:
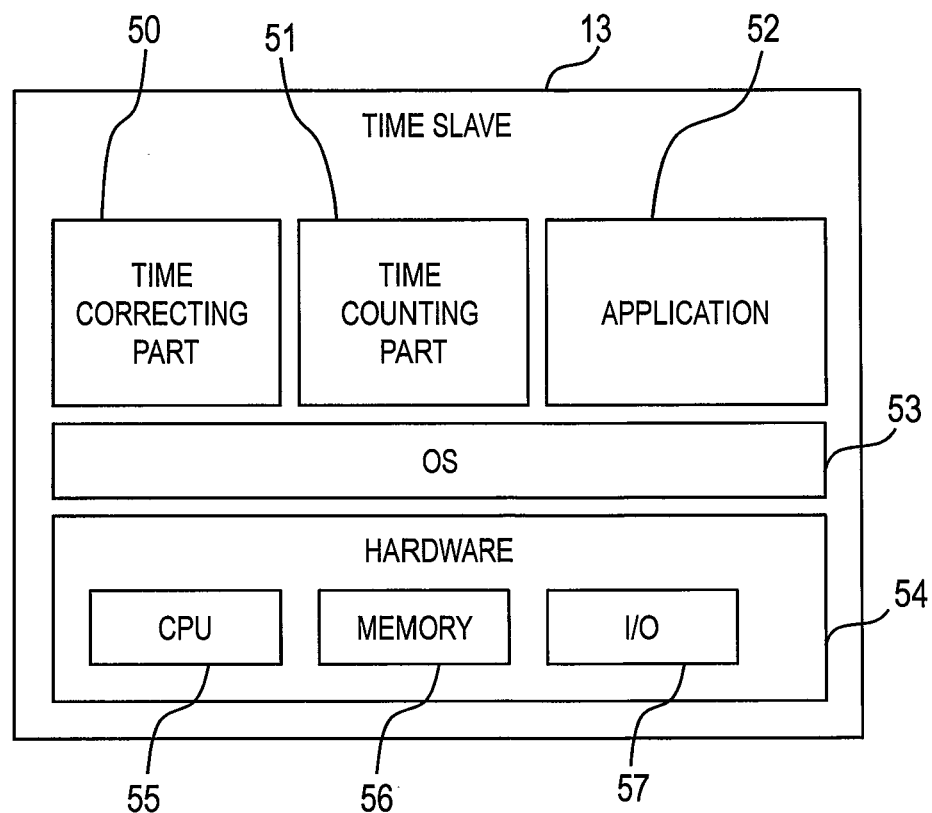
FIG. 2 is an explanatory diagram of a configuration of each time slave according to the first embodiment of this invention.

FIG. 2 is an explanatory diagram of the configuration of each time slave 13 according to the first embodiment of this invention.

The time slave 13 includes hardware 54 which includes a central processing unit (CPU) 55, a memory 56, an input/output unit (I/O) 57, and others. The CPU 55 is a processing part for executing various types of computing processing. The memory 56 is a storage part for storing various programs and data. The I/O 57 is an interface to the wide area networks 405, the relevant sensor 409, and the relevant control apparatus 409.

An operating system (OS) 53 resides in a layer above the hardware 54. The OS 53 is executed by the CPU 55.

A time correcting part 50, a time counting part 51, and an application 52 are located in a layer above the OS 53. The time correcting part 50, the time counting part 51, and the application 52 are implemented by the CPU 55 by executing their corresponding programs.

The time correcting part 50 corrects time that the time counting part 51 counts, based on a time packet received by the time slave 13. The time counting part 51 counts time. The application 52 executes processing related to the sensor 409 and the control apparatus 410 that are connected to the time slave 13.

Figure 3:
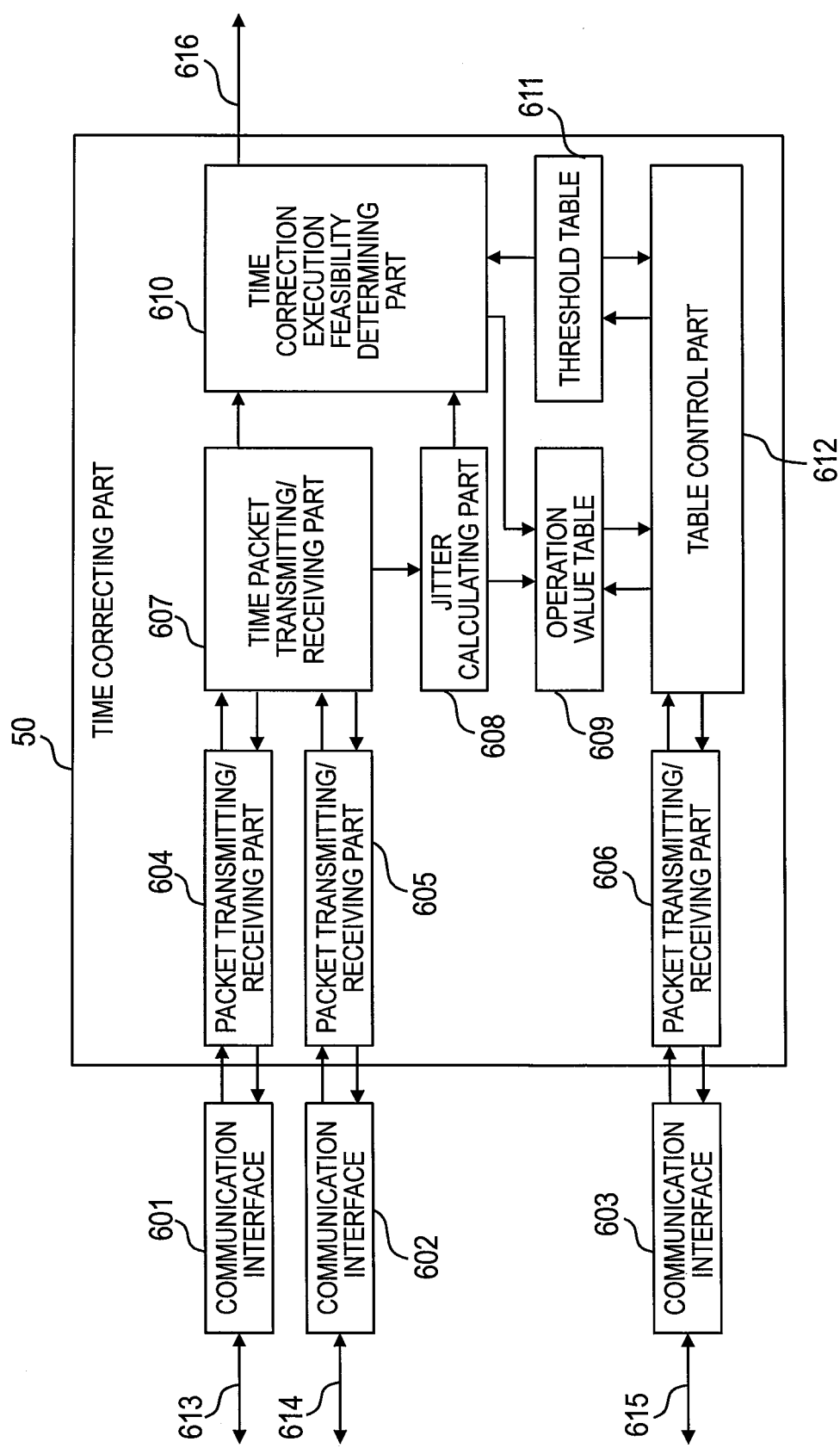
FIG. 3 is an explanatory diagram of a configuration of a time correcting part according to the first embodiment of this invention.

FIG. 3 is an explanatory diagram of the configuration of the time correcting part 50 according to the first embodiment of this invention.

The time correcting part 50 includes packet transmitting/receiving parts 604 to 606, a time packet transmitting/receiving part 607, a jitter calculating part 608, an operation value table 609, a time correction execution feasibility determining part 610, a threshold table 611, and a table control part 612.

The packet transmitting/receiving parts 604 to 606 are connected to communication interfaces 601 to 603 to transmit/receive packets. The packet transmitting/receiving part 604 is connected to the communication interface 601, which is coupled to a communication path 613 (the wide area network 405A). The packet transmitting/receiving part 605 is connected to the communication interface 602, which is coupled to a communication path 614 (the wide area network 405B). The packet transmitting/receiving part 606 is connected to the communication interface 603, which is coupled to a communication path 615 (a network coupled to the management node 402).

A time packet that is transmitted to the wide area network 405A from the time master 10 is received by the packet transmitting/receiving part 604 through the communication path 613 and the communication interface 601. A time packet that is transmitted to the wide area network 405B from the time master 10 is received by the packet transmitting/receiving part 605 through the communication path 614 and the communication interface 602.

In the manner described above, this embodiment is configured so that one packet communication path for transmitting a time packet, one communication interface, and one packet transmitting/receiving part are provided for each wide area network 405 that is used for time packet transmission.

The time packet transmitting/receiving part 607 receives a time packet when the packet transmitting/receiving part 604 or the packet transmitting/receiving part 605 inputs a time packet to the time packet transmitting/receiving part 607. The time packet transmitting/receiving part 607 is connected to the jitter calculating part 608 and the time correction execution feasibility determining part 610.

The jitter calculating part 608 is connected to the operation value table 609 and the time correction execution feasibility determining part 610, and calculates jitters of a time packet received by the time packet transmitting/receiving part 607 that are due to the relevant wide area network 405. Details of how the jitters are calculated are described with reference to FIG. 7.

The operation value table 609 is connected to the table control part 612. Registered in the operation value table 609 are values that are related to a received time packet and that are used in threshold change determining processing illustrated in FIG. 10, which is executed by the management node 402. Details of the operation value table 609 are described with reference to FIG. 6.

The time correction execution feasibility determining part 610 is connected to the operation value table 609 and the threshold table 611, and refers to the threshold table 611 to determine whether to execute processing of correcting time based on a received time packet. When it is determined that the time correcting processing is to be executed, the time correction execution feasibility determining part 610 corrects time and outputs corrected time information to the time counting part 51 through a communication path 616.

The threshold table 611 is connected to the table control part 612. Values used in the determining processing that is executed by the time correction execution feasibility determining part 610 are registered in the threshold table 611. Details of the threshold table 611 are described with reference to FIGS. 4 and 5.

The table control part 612 controls the operation value table 609 and the threshold table 611.

FIG. 4 is an explanatory diagram of the threshold table 611 according to the first embodiment of this invention. The threshold table 611 is stored in the memory 56.

The threshold table 611 includes a network name 71, a utilization status 72, a delay median 73, a jitter median 74, and a jitter tolerance 75.

Information by which the wide area network 405 that is coupled to the time slave 13 can be identified is registered as the network name 71. Information for identifying which wide area network 405 is being used for time packet transmission is registered as the utilization status 72. A median of the lengths of time packet delays that are due to the wide area network 405 is registered as the delay median 73. A median of jitters of time packets that are due to the wide area network 405 is registered as the jitter median 74. Registered as the jitter tolerance 75 is a value used in the determining processing that is executed by the time correction execution feasibility determining part 610 and that indicates a range set around the registered value of the jitter median 74.

Values registered in the threshold table 611 can have an arbitrary precision and unit, which are decided when the time synchronization system is built.

FIG. 5 is an explanatory diagram of a modification example of the threshold table 611 according to the first embodiment of this invention.

The threshold table 611 of FIG. 5 differs from the threshold table 611 of FIG. 4 in that a minimum jitter value 76 and a maximum jitter value 77 are included instead of the jitter median 74 and the jitter tolerance 75.

A minimum value of jitters used in the determining processing that is executed by the time correction execution feasibility determining part 610 is registered as the minimum jitter value 76. A maximum value of jitters used in the determining processing that is executed by the time correction execution feasibility determining part 610 is registered as the maximum jitter value 77.

FIG. 6 is an explanatory diagram of the operation value table 609 according to the first embodiment of this invention.

The operation value table 609 includes a network name 81, a mean delay 82, a mean jitter 83, a jitter standard deviation 84, a time packet arrival count 85, and a time correction cancellation count 86.

Information by which the wide area network 405 that is coupled to the time slave 13 can be identified is registered as the network name 81. A mean value of the lengths of time packet delays that are due to the wide area network 405 is registered as the mean delay 82. A mean value of jitters of time packets that are due to the wide area network 405 is registered as the mean jitter 83. A standard deviation of jitters of time packets that are due to the wide area network 405 is registered as the jitter standard deviation 84. The number of times the time slave 13 has received a time packet is registered as the time packet arrival count 85. The number of times the time correction execution feasibility determining part 610 has determined the time correcting processing is not to be executed is registered as the time correction cancellation count 86.

The mean delay 82, the mean jitter 83, and the jitter standard deviation 84 are values related to a delay of a time packet that is due to a wide area network. The jitter standard deviation 84 may not necessarily be included in the operation value table 609.

Values registered in the operation value table 609 can have an arbitrary precision and unit, which are decided when the time synchronization system is built.

Figure 7:
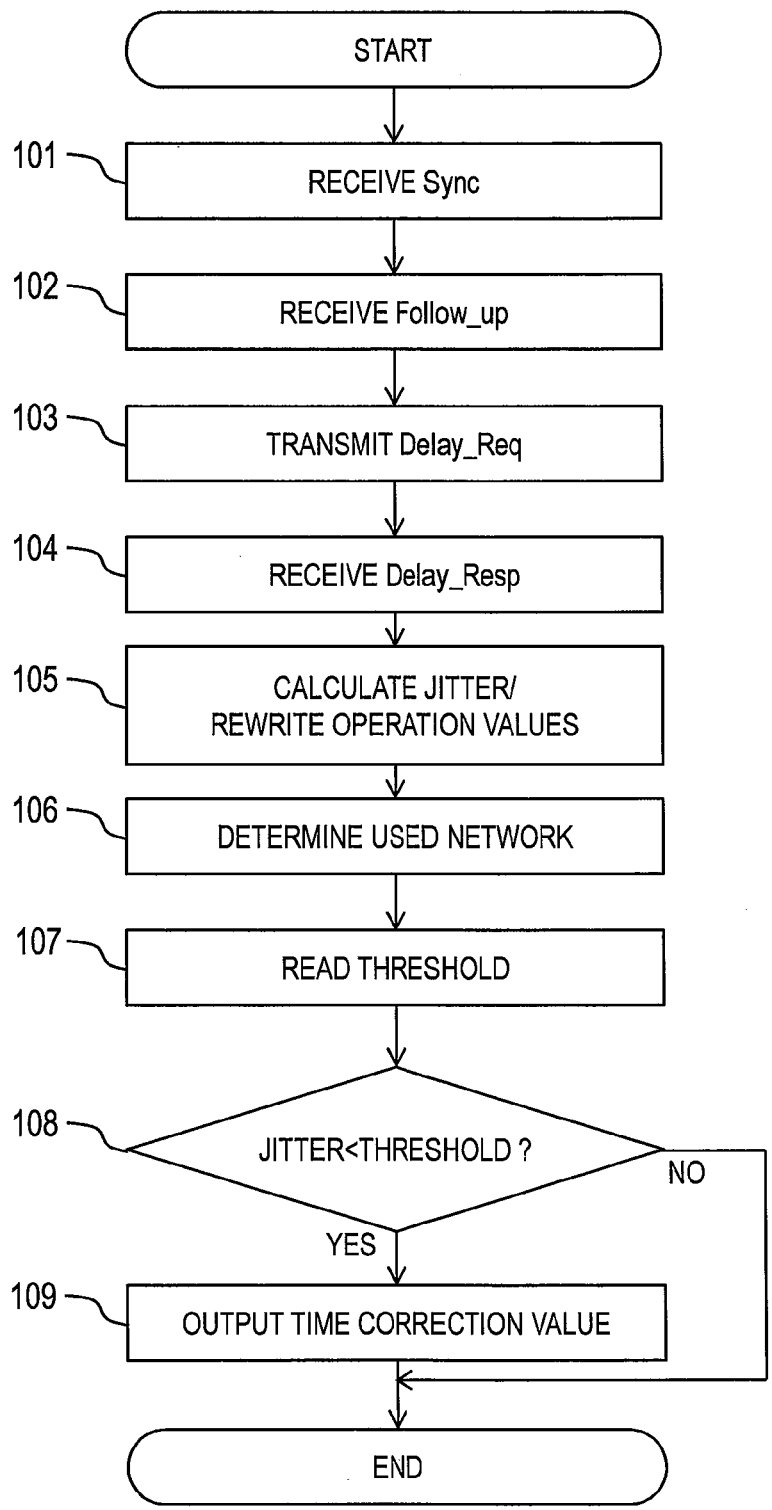
FIG. 7 is a flow chart of time correcting processing that is executed by the time correcting part according to the first embodiment of this invention.

FIG. 7 is a flow chart of the time correcting processing that is executed by the time correcting part 50 according to the first embodiment of this invention.

First, the time packet transmitting/receiving part 607 receives a Sync message contained in a time packet (101). The time packet transmitting/receiving part 607 next receives a Follow_up message contained in the time packet (102). The time packet transmitting/receiving part 607 then transmits a Delay_Req message to the time master 10 (103). Next, the time packet transmitting/receiving part 607 receives a Delay_Resp message out of a time packet (104).

Steps 101 to 104 are processing defined in IEEE 1588 v2, and the time slave 13 can obtain a time packet by executing these processing steps.

Figure 20:
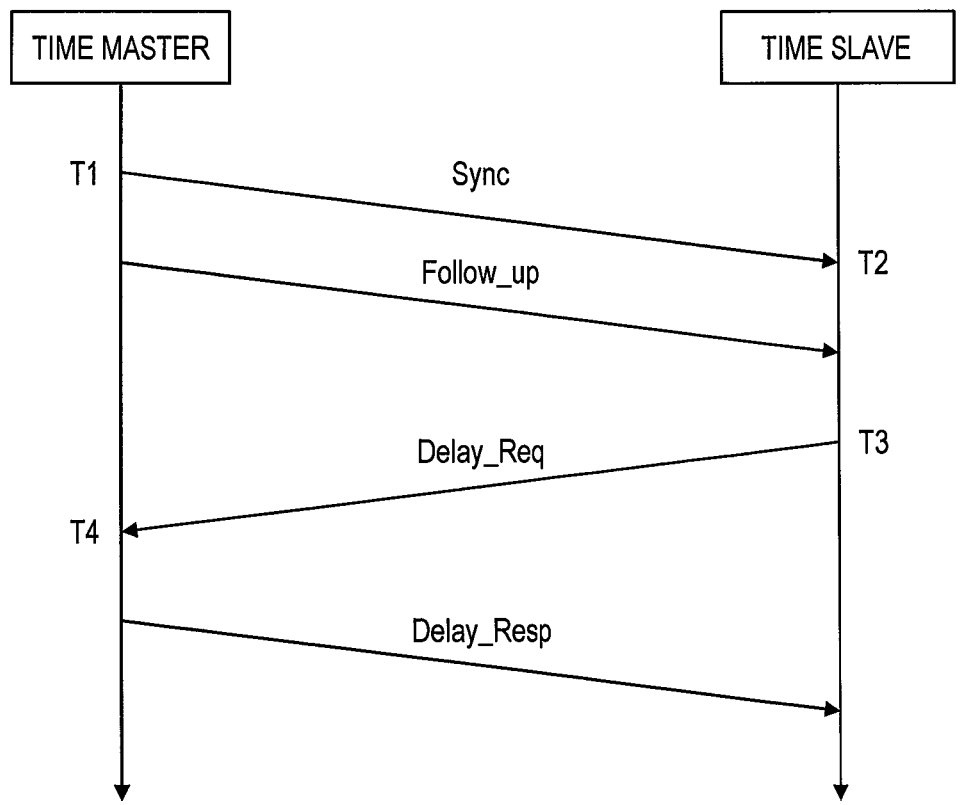
FIG. 20 is a sequence diagram illustrating a communication sequence according to a basic time synchronization algorithm of IEEE 1588.
Figure 21:
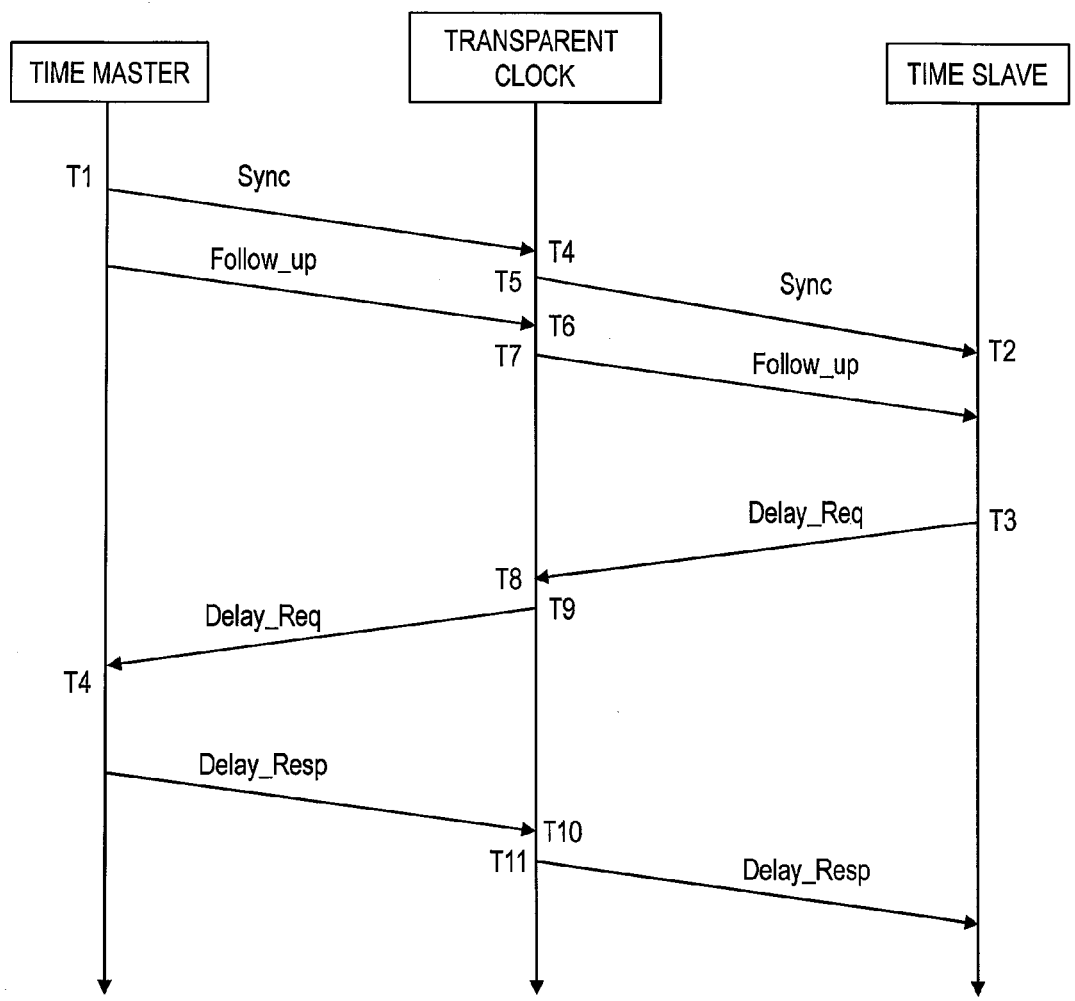
FIG. 21 is a sequence diagram illustrating a communication sequence according to a time synchronization algorithm of a system that includes a switch with a transparent clock function that conforms to IEEE 1588 v2.

Next, the jitter calculating part 608 calculates the amount of delay of the received time packet that is due to the wide area network 405, and compares the calculated delay amount with a value registered as the delay median 73 in the threshold table 611 to calculate jitters (105). Specifically, the jitter calculating part 608 calculates the delay amount of the wide area network 405 with the use of the times T1, T2, T3, and T4 in the time synchronization method according to IEEE 1588 v2 which has been described with reference to FIG. 20. The delay amount of the wide area network 405 is calculated by Expression 5.

$$\text{Delay amount} = \{(T4-T3)+(T2-T1)\}/2 \quad \text{Expression 5}$$

Jitters are calculated by Expression 6.

$$\text{Jitter} = \text{delay median} - \text{delay amount} \quad \text{Expression 6}$$

In Step 105, the jitter calculating part 608 also updates values registered as the mean delay 82, the mean jitter 83, and the jitter standard deviation 84 in the operation value table 609 with the use of the calculated delay amount and jitters. The jitter calculating part 608 increments the time packet arrival count 85 of the operation value table 609 as well.

Next, the time correction execution feasibility determining part 610 reads information registered as the utilization status 72 in the threshold table 611 to determine the wide area network 405 that has been used in the transmission of the received time packet (106).

The time correction execution feasibility determining part 610 next searches entries of the threshold table 611 for an entry for the wide area network 405 that has been used in the transmission of the received time packet, and reads, as a threshold, values that are registered in the entry as the jitter median 74 and the jitter tolerance 75 (107).

The time correction execution feasibility determining part 610 compares the jitters calculated in Step 105 and the threshold read in Step 107 to determine whether or not the jitters calculated in Step 105 are smaller than the threshold read in Step 107 (108).

When it is determined in Step 108 that the jitters calculated in Step 105 are smaller than the threshold read in Step 107, the time correction execution feasibility determining part 610 executes processing of correcting time based on the received time packet (109), outputs corrected time information to the time counting part 51, and ends the time correcting processing.

When it is determined in Step 108 that the jitters calculated in Step 105 are equal to or more than the threshold read in Step 107, the time correction execution feasibility determining part 610 increments the time correction cancellation count 86 of the operation value table 609 and ends the time correcting processing, without executing the correcting processing of Step 109 which is processing of correcting time based on the received time packet.

Figure 8:
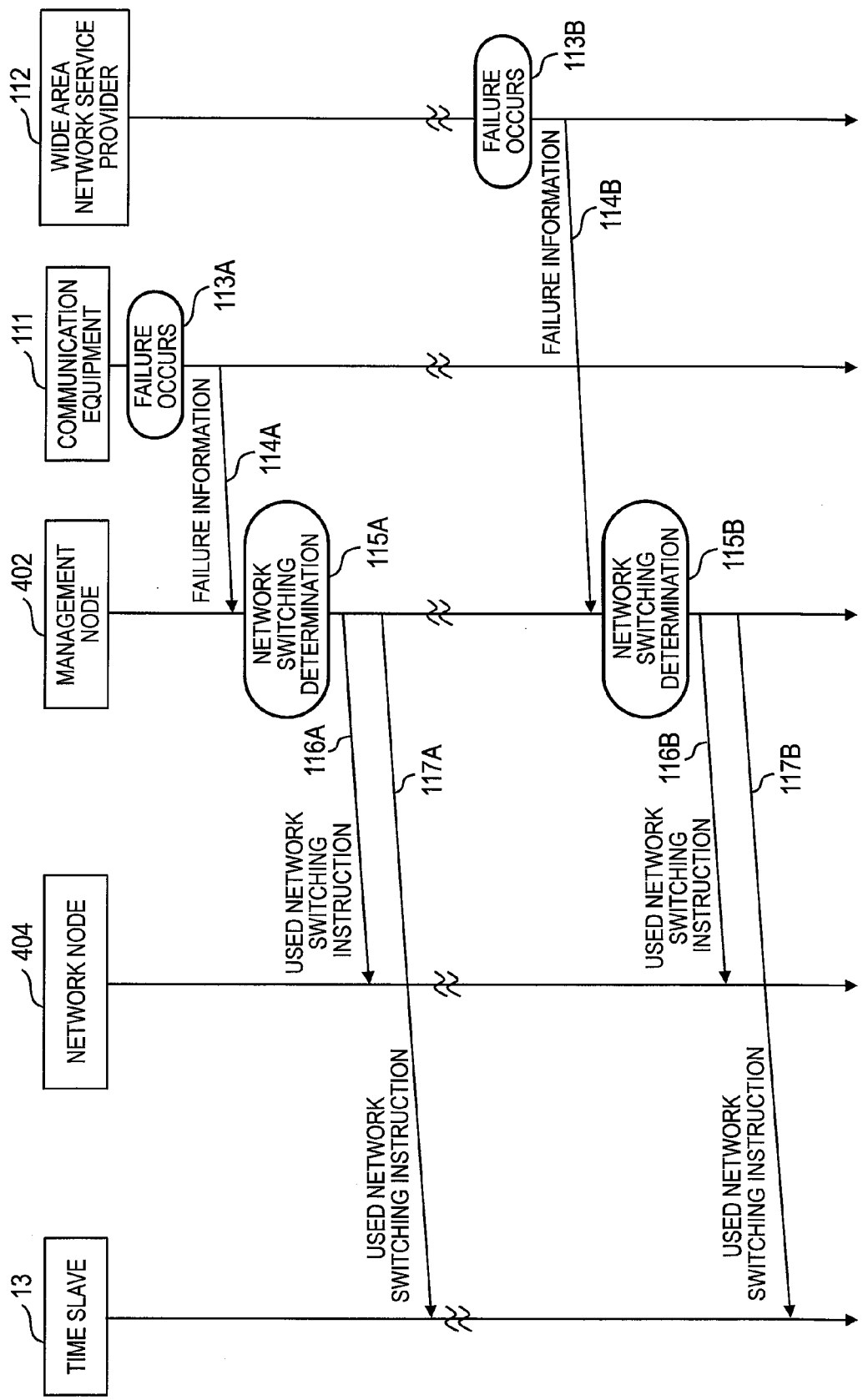
FIG. 8 is a sequence diagram in which a management node sends a used network switching instruction to one of the time slaves according to the first embodiment of this invention.

FIG. 8 is a sequence diagram in which the management node 402 sends a used network switching instruction to one of the time slaves 13 according to the first embodiment of this invention.

In the case where the time synchronization system has its own wide area networks 405, or in similar cases, communication equipment 111 used to build one of the wide area networks 405 detects a failure (113A) and transmits failure information which indicates the occurrence of a failure to the management node 402 (114A).

In the case where users use the wide area networks 405 provided by a wide area network service provider 112, or in similar cases, a server of the wide area network service provider 112 detects a failure (113B) and transmits failure information which indicates the occurrence of a failure to the management node 402 (114B).

Alternatively, the management node 402 may detect a failure by reading failure information out of the communication equipment 111 or the server of the wide area network service provider 112.

The management node 402 receives the failure information from the communication equipment 111 or the server of the wide area network service provider 112, and executes network switching determining processing (115A and 115B). The network switching determining processing is processing that is executed when a failure is detected in the wide area network 405 that has been used for time packet transmission in order to identify the wide area network 405 where a failure has not been detected as the wide area network 405 to be newly used for time packet transmission (a switched-to wide area network).

The management node 402 next transmits to the network node 404 a used network switching instruction that includes information for identifying the switched-to wide area network (116A and 116B), and transmits the used network switching instruction to the relevant time slave 13 (117A and 117B).

The network node 404 receives the used network switching instruction and switches the wide area network 405 for transmitting a packet that is received from the intra-base network 403 to the switched-to wide area network 405. The wide area network 405 to which the time master transmits a time packet is thus switched to the switched-to wide area network.

The time slave 13 that receives the used network switching instruction rewrites the utilization status 72 in the threshold table 611 based on the used network switching instruction received. Details of this processing are described with reference to FIG. 13.

Figure 9:
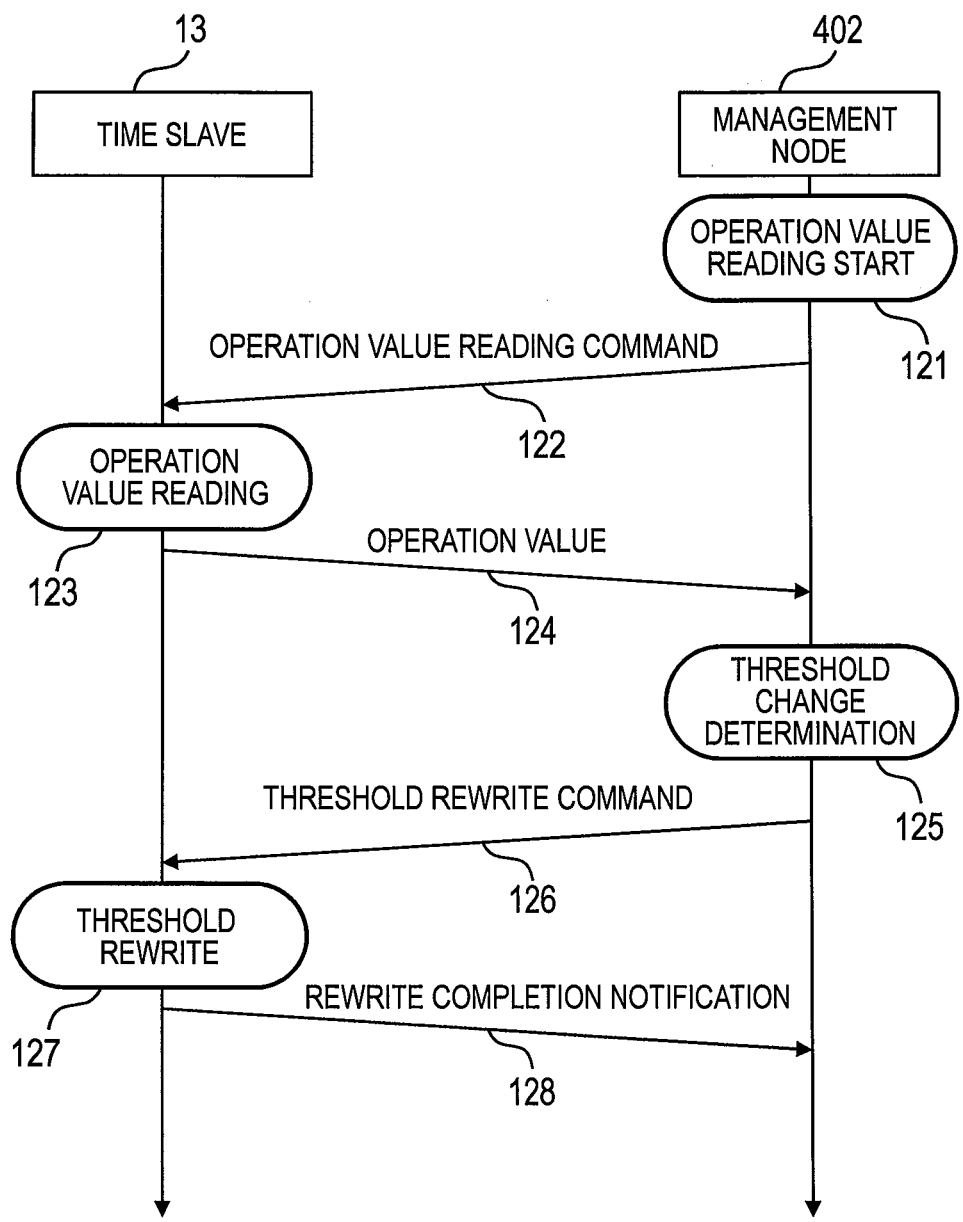
FIG. 9 is a sequence diagram of processing of reading the operation value table and processing of rewriting the threshold table which are executed by the management node according to the first embodiment of this invention.

FIG. 9 is a sequence diagram of processing of reading the operation value table 609 and processing of rewriting the threshold table 611 which are executed by the management node 402 according to the first embodiment of this invention.

The management node 402 starts reading, at a given timing, operation values registered in the operation value table 609 that is stored in the time slave 13 of interest (121), and transmits an operation value reading command to the time slave 13 (122). The operation value reading command includes information for identifying the wide area network 405 of which operation values are to be read.

The time slave 13 receives the operation value reading command and selects, from among entries of the operation value table 609, an entry where the network name 81 matches the information for identifying one of the wide area networks 405 which is included in the received operation value reading command. The time slave 13 reads, as operation values, values registered in the selected entry as the mean delay 82, the mean jitter 83, the jitter standard deviation 84, the time packet arrival count 85, and the time correction cancellation count 86 (123). The time slave 13 transmits the read operation values to the management node 402 (124).

The management node 402 receives the operation values and executes threshold change determining processing for determining whether or not the threshold needs to be changed based on the received operation values (125). Details of the threshold change determining processing are described with reference to FIG. 10.

When it is determined by the threshold change determining processing that the threshold needs to be changed, the management node 402 transmits to the time slave 13 a threshold rewrite command which is a command to rewrite a threshold registered in the threshold table 611 of the time slave 13 (126). The threshold rewrite command includes information for identifying the wide area network 405 for which the threshold is to be rewritten and a value with which the threshold is rewritten (a threshold rewrite value).

The time slave 13 receives the threshold rewrite command and, based on the received threshold rewrite command, rewrites the threshold registered in the threshold table 611 (127). Specifically, the time slave 13 selects from among entries of the threshold table 611 an entry where the network name 71 matches the information for identifying one of the wide area networks 405 which is included in the threshold rewrite command. The time slave 13 rewrites the threshold in the selected entry. In the case where the threshold table 611 stored in the time slave 13 is as shown in FIG. 4, the time slave 13 rewrites the jitter tolerance 75 based on the threshold rewrite value. In the case where the threshold table 611 stored in the time slave 13 is as illustrated in FIG. 5, on the other hand, the time slave 13 rewrites the minimum jitter value 76 and the maximum jitter value 77 each with the threshold rewrite value.

After rewriting the threshold, the time slave 13 transmits a rewrite completion notification to the management node 402 (128).

In the manner described above, the management node 402 determines whether or not the currently set threshold is appropriate based on information about a time packet that the time slave 13 has actually received and, when the threshold is not appropriate, changes the threshold. The threshold can thus be kept appropriate all the time.

The management node 402 in the description given above includes, in an operation value reading command, information for identifying the wide area network 405 of which operation values are to be read. Alternatively, all entries where operation values of the wide area networks 405 are registered may be read out of the operation value table 609 that is stored in the time slave 13 of interest. For example, the management node 402 may transmit to the time slave 13 an operation value reading command that includes information indicating the reading of all entries of the operation value table 609. Then the time slave 13 reads, as operation values, values registered as the mean delay 82, the mean jitter 83, the jitter standard deviation 84, the time packet arrival count 85, and the time correction cancellation count 86 out of all entries, and transmits the read operation values to the management node 402. The management node 402 determines for each read entry whether or not the threshold needs to be changed, and transmits threshold rewrite commands only for entries where the threshold needs to be changed.

In FIG. 9, the management node 402 transmits an operation value reading command to the time slave 13 at a given timing. Alternatively, the time slave 13 may notify the management node 402 when an operation value registered in the operation value table 609 satisfies a given condition of the fact so that the management node 402 notified of the fact that the operation value satisfies a given condition transmits an operation value reading command to the time slave 13. For example, when the jitter standard deviation 84 of the operation value table 609 exceeds a given value "1.5", the time slave 13 may notify the fact.

This ensures that the threshold change determining processing is executed only the likelihood of the threshold not being appropriate is strong, and thus lessens processing load on the management node 402.

Figure 10:
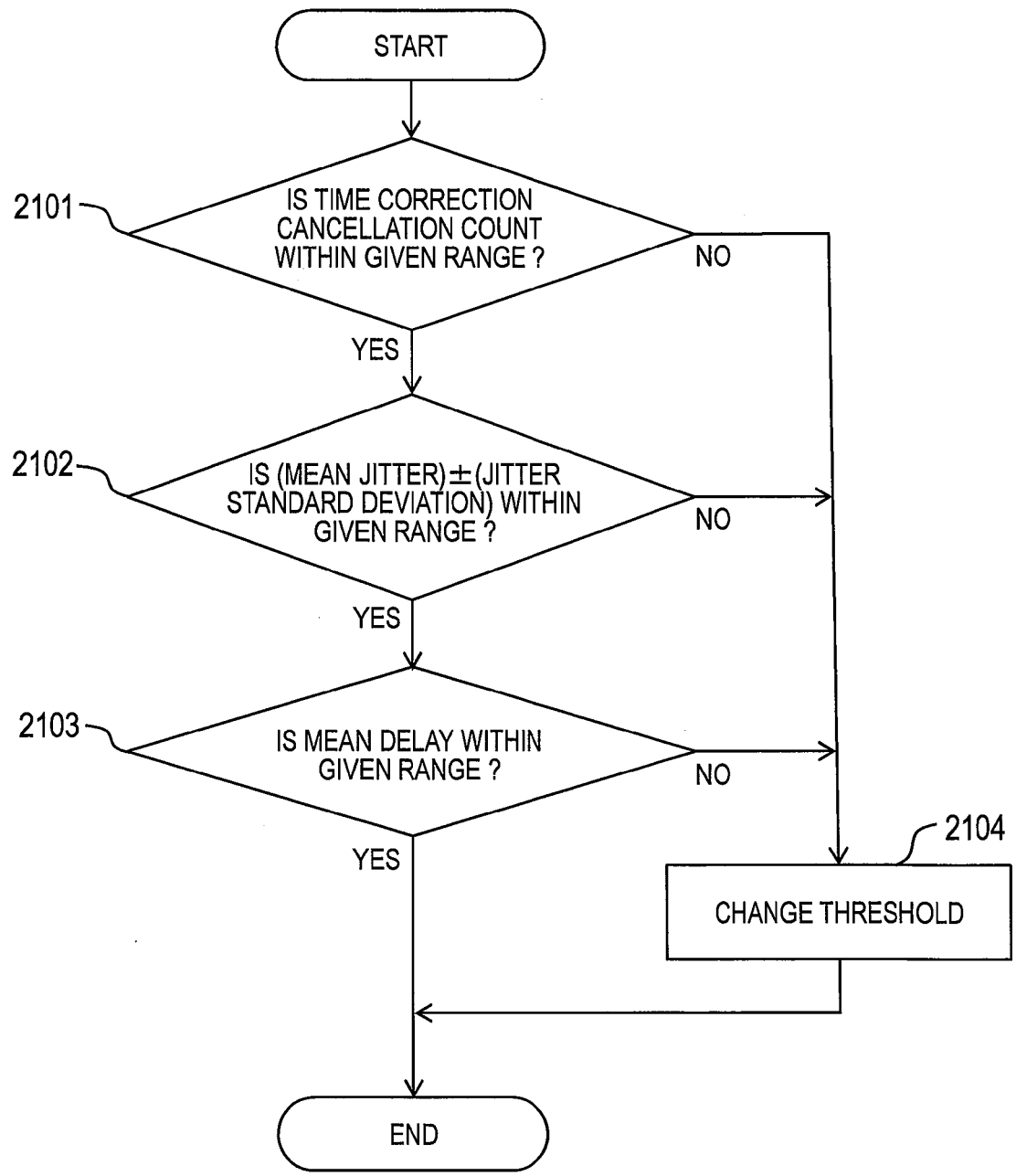
FIG. 10 is a flow chart of threshold change determining processing according to the first embodiment of this invention.

FIG. 10 is a flow chart of the threshold change determining processing according to the first embodiment of this invention.

Figure 11:
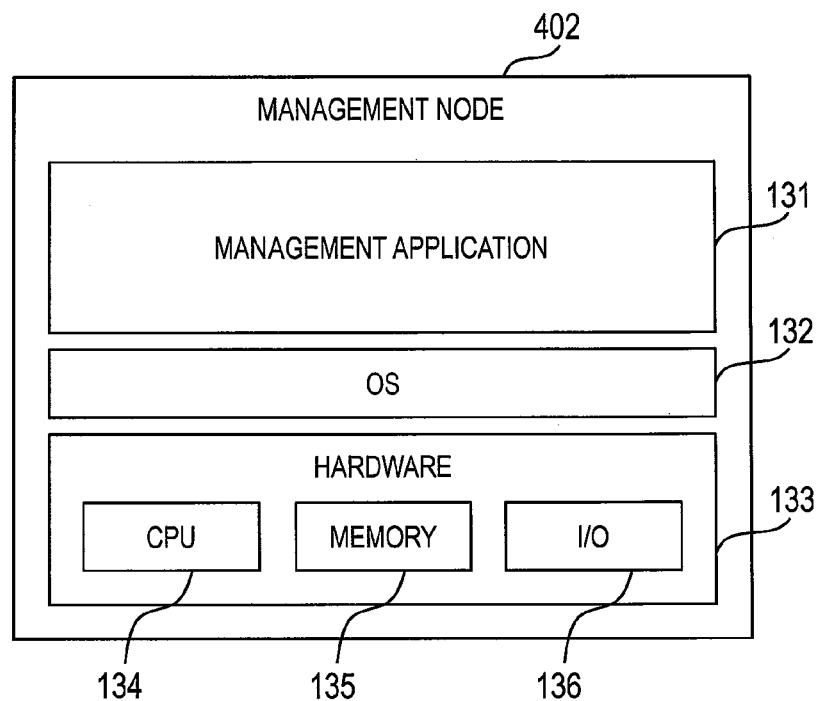
FIG. 11 is an explanatory diagram of a configuration of the management node according to the first embodiment of this invention.

The threshold change determining processing is processing included in a management application 131, which is illustrated in FIG. 11, and is executed by a CPU 134 of FIG. 11.

The management node 402 first determines whether or not a value registered as the time correction cancellation count 86 that is included among the received operation values is within a given range (2101).

When it is determined that the value registered as the time correction cancellation count 86 is not within the given range, the management node 402 determines that the threshold needs to be changed (2104), determines a value with which the threshold is to be rewritten, and ends the threshold change determining processing.

Specifically, in the case where the value registered as the time correction cancellation count 86 is lower than the lower limit value of the given range, it means that fluctuations in time packet delay due to the relevant wide area network 405 are small, and the management node 402 accordingly determines a rewrite value that narrows the threshold range by a given amount. In the case where the value registered as the time correction cancellation count 86 is higher than the upper limit value of the given range, on the other hand, it means that fluctuations in time packet delay due to the relevant wide area network 405 are large, and the management node 402 accordingly determines a rewrite value that widens the threshold range by a given amount. The given amount by which the threshold range is changed can be set by a user.

When it is determined that the value registered as the time correction cancellation count 86 is within the given range, the management node 402 calculates (a value registered as the mean jitter 83)±(a value registered as the jitter standard deviation 84), and determines whether or not the calculated value is within a given range (2102).

When it is determined that the value calculated in Step 2102 is not within the given range, the management node 402 proceeds to Step 2104 to determine a threshold rewrite value, and then ends the threshold change determining processing. That the value calculated in Step 2102 is outside the given range signifies here large fluctuations in time packet delay due to the relevant wide area network 405, and the management node 402 accordingly determines a rewrite value that widens the threshold range by a given amount. When it is determined that the value calculated in Step 2102 is within the given range, the management node 402 may determine that the threshold does not need to be changed, and ends the threshold change determining processing.

When it is determined that the value calculated in Step 2102 is within the given range, the management node 402 determines whether or not a value registered as the mean delay 82 that is included among the received operation values is within a given range (2103). It is preferred to set as the given range some range centered around the delay median 73 that is associated with this mean delay 82.

When it is determined in Step 2103 that the value registered as the mean delay 82 is not within the given range, the management node 402 proceeds to Step 2104 to determine a threshold rewrite value, and then ends the threshold change determining processing. That the value registered as the mean delay 82 is outside the given range signifies here large fluctuations in time packet delay due to the relevant wide area network 405, and the management node 402 accordingly determines a rewrite value that widens the threshold range by a given amount.

When it is determined in Step 2103 that the value registered as the mean delay 82 is within the given range, the management node 402 determines that the threshold does not need to be changed, and ends the threshold change determining processing.

The threshold change determining processing may instead be executed by the time slave 13 by referring to the operation value table 609. The time slave 13 in this case notifies the result of the determining processing to the management node 402.

This invention encompasses various modification examples of Step 2102 where the management node 402 calculates (mean jitter)±(jitter standard deviation). For instance, the management node 402 may calculate (mean jitter)±2×(jitter standard deviation). This is because Step 2102 is for determining the range and distribution of jitters.

Step 2101 where the management node 402 determines whether or not a value registered as the time correction cancellation count 86 that is included among the received operation values is within a given range may also be modified so that the management node 402 determines whether or not the ratio of a value registered as the time correction cancellation count 86 that is included among the received operation values to a value registered as the time packet arrival count 85 that is included among the received operation values is within a given range.

FIG. 11 is an explanatory diagram of the configuration of the management node 402 according to the first embodiment of this invention.

The management node 402 has hardware 133 which includes the central processing unit (CPU) 134, a memory 135, an input/output unit (I/O) 136, and others. The CPU 134 is a processing part for executing various types of computing processing. The memory 135 is a storage part for storing various programs and data. The I/O 136 is an interface to the intra-base network 403.

An operating system (OS) 132 resides in a layer above the hardware 133. The OS 132 is executed by the CPU 134.

The management application 131 is located in a layer above the OS 132. The management application 131 is implemented by the CPU 134 by executing a corresponding program.

The management application 131 includes the network switching determining processing which is described above with reference to FIG. 8 and denoted by 115A and 115B, the operation value reading start processing 121 which is described above with reference to FIG. 9, and the threshold change determining processing 125 which is described above with reference to FIGS. 9 and 10.

Figure 12:
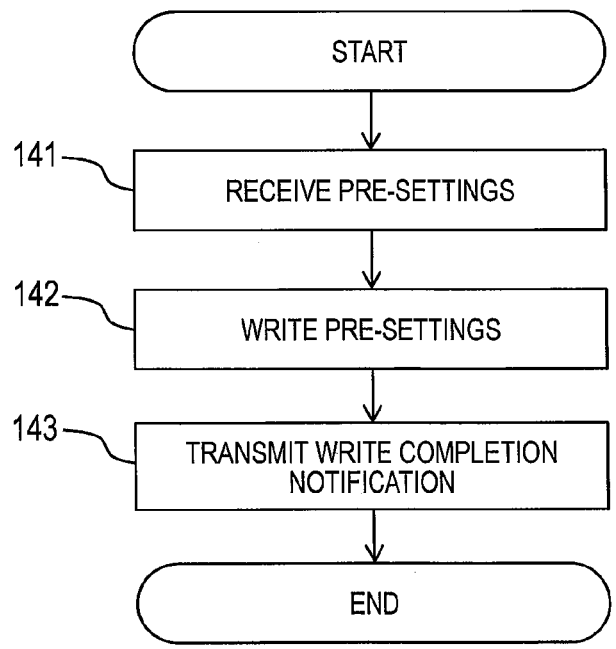
FIG. 12 is a flow chart of presetting processing which is executed to set the threshold table in advance by a table control part of the time correcting part according to the first embodiment of this invention.

FIG. 12 is a flow chart of presetting processing which is executed to set the threshold table 611 in advance by the table control part 612 of the time correcting part 50 according to the first embodiment of this invention.

The table control part 612 first receives pre-settings information of the threshold table 611 from the management node 402 (141). The pre-settings information includes the name and utilization status of one of the wide area networks 405, a delay median, a jitter median, and a jitter tolerance.

The table control part 612 next writes the received pre-settings information in the threshold table 611 (142).

Specifically, the table control part 612 creates a new entry to the threshold table 611 to write, in the created entry, the name of the wide area network 405 that is included in the pre-settings information as the network name 71, the utilization status that is included in the pre-settings information as the utilization status 72, the delay median that is included in the pre-settings information as the delay median 73, the jitter median that is included in the pre-settings information as the jitter median 74, and the jitter tolerance that is included in the pre-settings information as the jitter tolerance 75.

The table control part 612 then notifies the management node 402 of the completion of the write in the threshold table 611 (143), and ends the presetting processing.

The threshold table 611 is thus a table set in advance, and the management node 402 can set the threshold table 611 in advance.

Figure 13:
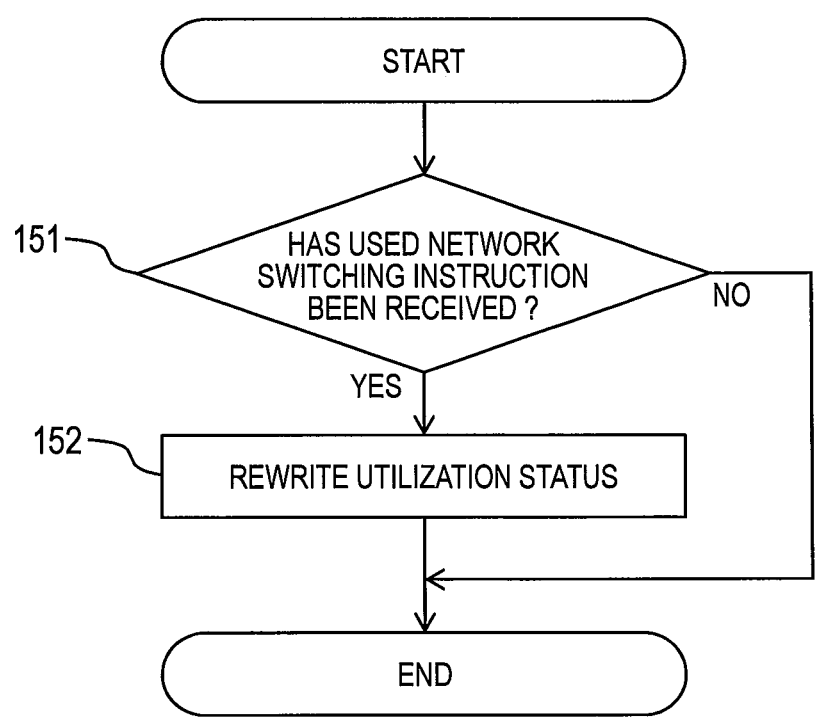
FIG. 13 is a flow chart of processing of rewriting a utilization status in the threshold table which is executed by the table control part of the time correcting part according to the first embodiment of this invention.

FIG. 13 is a flow chart of processing of rewriting a utilization status in the threshold table 611 which is executed by the table control part 612 of the time correcting part 50 according to the first embodiment of this invention. The utilization status rewriting processing is executed repeatedly at a given timing.

The table control part 612 first determines whether or not a used network switching instruction transmitted from the management node 402 has been received (151).

When it is determined in Step 151 that a used network switching instruction has not been received, the table control part 612 ends the utilization status rewriting processing.

When it is determined in Step 151 that a used network switching instruction has been received, on the other hand, the table control part 612 rewrites the utilization status 72 of the threshold table 611 based on the used network switching instruction (152), and then ends the utilization status rewriting processing.

Specifically, the table control part 612 selects from among entries of the threshold table 611 an entry where the network name 71 matches information that is included in the used network switching instruction received and that identifies the switched-to wide area network 405, and updates the utilization status 72 to "in use" in the selected entry. The time slave 13 also selects from among entries of the threshold table 611 an entry where the utilization status 72 has been "in use" and updates the utilization status to "not in use" in the selected entry.

In this way, the time correction execution feasibility determining part 610 of the time slave 13 can complete processing of reading a threshold out of the threshold table 611 (Step 107 of FIG. 7) more quickly than in the case where the wide area network 405 through which a time packet is received is identified each time.

In this embodiment, the management node 402 manages which wide area network 405 is used by the time master 10 to transmit a time packet and, when the wide area network 405 used by the time master 10 for time packet transmission is switched to another wide area network 405, notifies the switched-to wide area network 405 to the relevant time slave 13. The time slave 13 can thus detect the switching of the wide area network 405 used by the time master 10 for time packet transmission immediately after the switching.

The management node 402 also determines for each time slave 13 the propriety of the threshold based on the value related to a time packet that has actually been received by the time slave 13, thereby enabling the time slave 13 to base the determination of whether to execute time correction on an appropriate threshold.

Second Embodiment

A second embodiment of this invention is described below with reference to FIGS. 14 and 15.

In the first embodiment, a case where the time master 10 selects and uses one out of a plurality of wide area networks 405 to transmit a time packet has been described. Described in the second embodiment is the difference from the first embodiment of a case where the time master 10 selects and uses at least one out of a plurality of wide area networks 405 to transmit a time packet.

Figure 14:
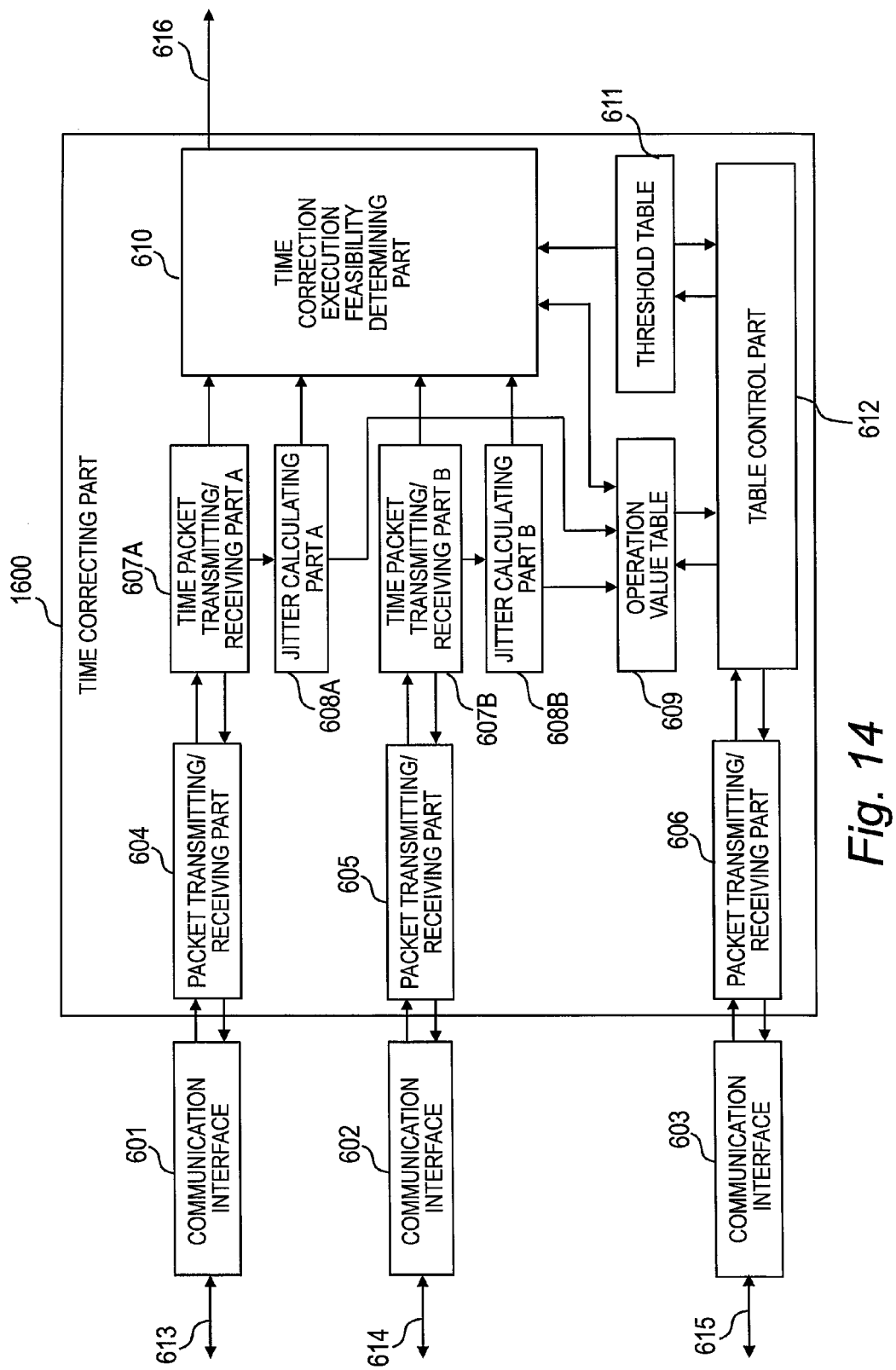
FIG. 14 is an explanatory diagram of the configuration of the time correcting part according to a second embodiment of this invention.

FIG. 14 is an explanatory diagram of the configuration of a time correcting part 1600 according to the second embodiment of this invention. Components of the time correcting part 1600 that are the same as those of the time correcting part 50 illustrated in FIG. 3 are denoted by the same reference symbols, and descriptions thereof are omitted.

The time correcting part 1600 of this embodiment differs from the time correcting part 50 of the first embodiment in that one time packet transmitting/receiving part 607 and one jitter calculating part 608 are provided for each wide area network 405. Specifically, a time packet transmitting/receiving part A 607A is connected to the packet transmitting/receiving part 604, which is coupled to the wide area network 405A, and a jitter calculating part A 608A is connected to the time packet transmitting/receiving part A 607A. A time packet transmitting/receiving part B 607B is connected to the packet transmitting/receiving part 605, which is coupled to the wide area network 405B, and a jitter calculating part B 608B is connected to the time packet transmitting/receiving part B 607B.

Figure 15:
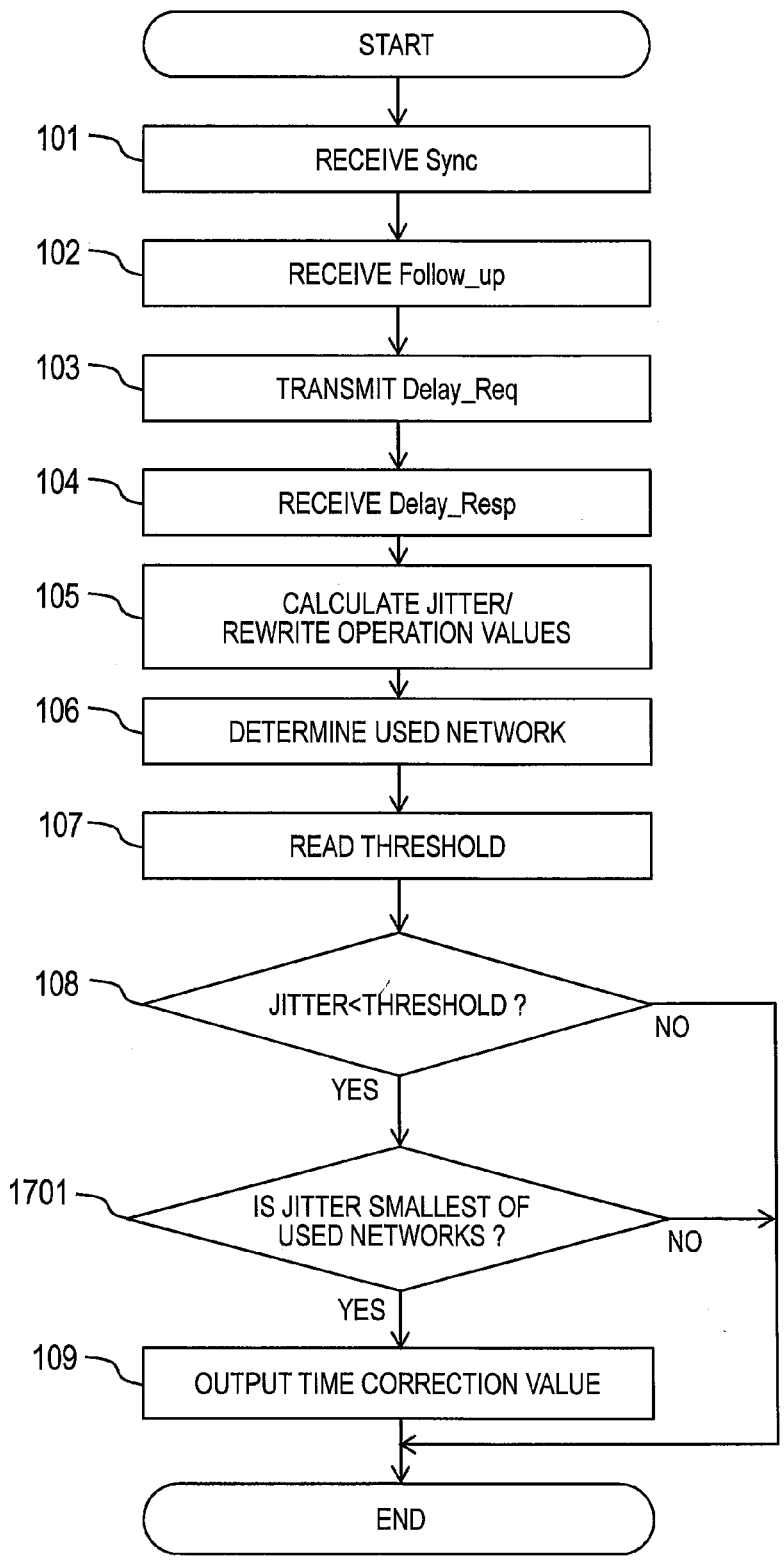
FIG. 15 is a flow chart of the time correcting processing that is executed by the time correcting part according to the second embodiment of this invention.

FIG. 15 is a flow chart of the time correcting processing that is executed by the time correcting part 1600 according to the second embodiment of this invention. Steps of the time correcting processing of this embodiment that are the same as those of the time correcting processing of the first embodiment illustrated in FIG. 7 are denoted by the same reference symbols, and descriptions thereof are omitted.

In the time correcting processing of this embodiment, when it is determined in Step 108 that the jitters calculated in Step 105 are smaller than the threshold read in Step 107, the time correction execution feasibility determining part 610 determines whether or not the jitters calculated in Step 105 are the smallest of jitters of the wide area networks 405 that are in use (1701).

When it is determined in Step 1701 that the jitters calculated in Step 105 are the smallest of jitters of the wide area networks 405 that are in use, the time correction execution feasibility determining part 610 proceeds to Step 109 to execute time correction processing based on the received time packet (109), outputs corrected time information to the time counting part 51, and ends the time correcting processing.

When it is determined in Step 1701 that the jitters calculated in Step 105 are not the smallest of jitters of the wide area networks 405 that are in use, on the other hand, the time correction execution feasibility determining part 610 increments the time correction cancellation count 86 of the operation value table 609 and ends the time correcting processing, without executing the processing (109) of correcting time based on the received time packet.

In this embodiment, where the time master 10 uses a plurality of wide area networks 405 to transmit a time packet, the time correcting part 1600 receives time packets from a plurality of wide area networks 405. Jitters therefore vary depending on through which wide area network 405 the time packet has been received. Consequently, if the time correcting processing is executed without executing Step 1701, there is a chance that the correction makes time inaccurate. This invention prevents time inaccuracy due to correction by executing time correcting processing only when it is confirmed in Step 1701 that the jitters calculated in Step 105 are the smallest of jitters of the wide area networks 405 that are in use.

Third Embodiment

A third embodiment of this invention is described below with reference to FIGS. 16 to 18.

In this embodiment, a network apparatus 181 is provided for each time slave 13 to be placed between the time slave 13 and the wide area networks 405. The difference of the third embodiment from the first embodiment is described below.

Each time slave 13 in the first embodiment has a communication interface and a packet transmitting/receiving part for each of the wide area networks 405 and the network that is coupled to the management node (the communication interfaces 601 to 603 and the packet transmitting/receiving part 604 to 606). In this embodiment, the network apparatus 181 converts three physical network interfaces into one network interface so that the time slave 13 only needs to have one communication interface 2001 illustrated in FIG. 18 and one packet transmitting/receiving part 2002 illustrated in FIG. 18.

Figure 16:
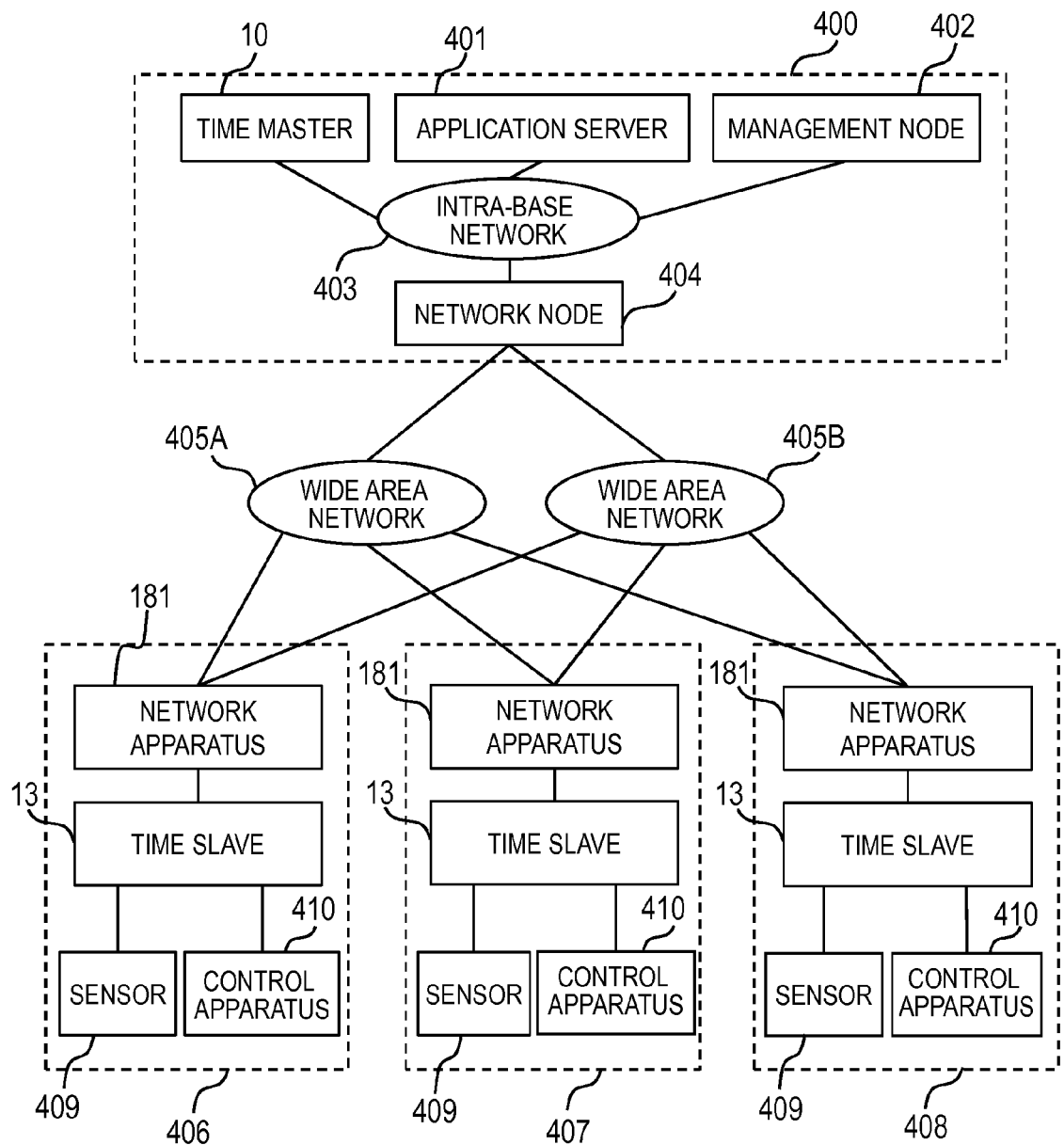
FIG. 16 is an explanatory diagram of the configuration of the time synchronization system according to a third embodiment of this invention.

FIG. 16 is an explanatory diagram of the configuration of the time synchronization system according to the third embodiment of this invention.

The network apparatus 181 is coupled to the wide area networks 405A and 405B, and connected to the time slave 13 as well. In other words, the network apparatus 181 relays between the wide area networks 405 and the time slave 13.

Figure 17:
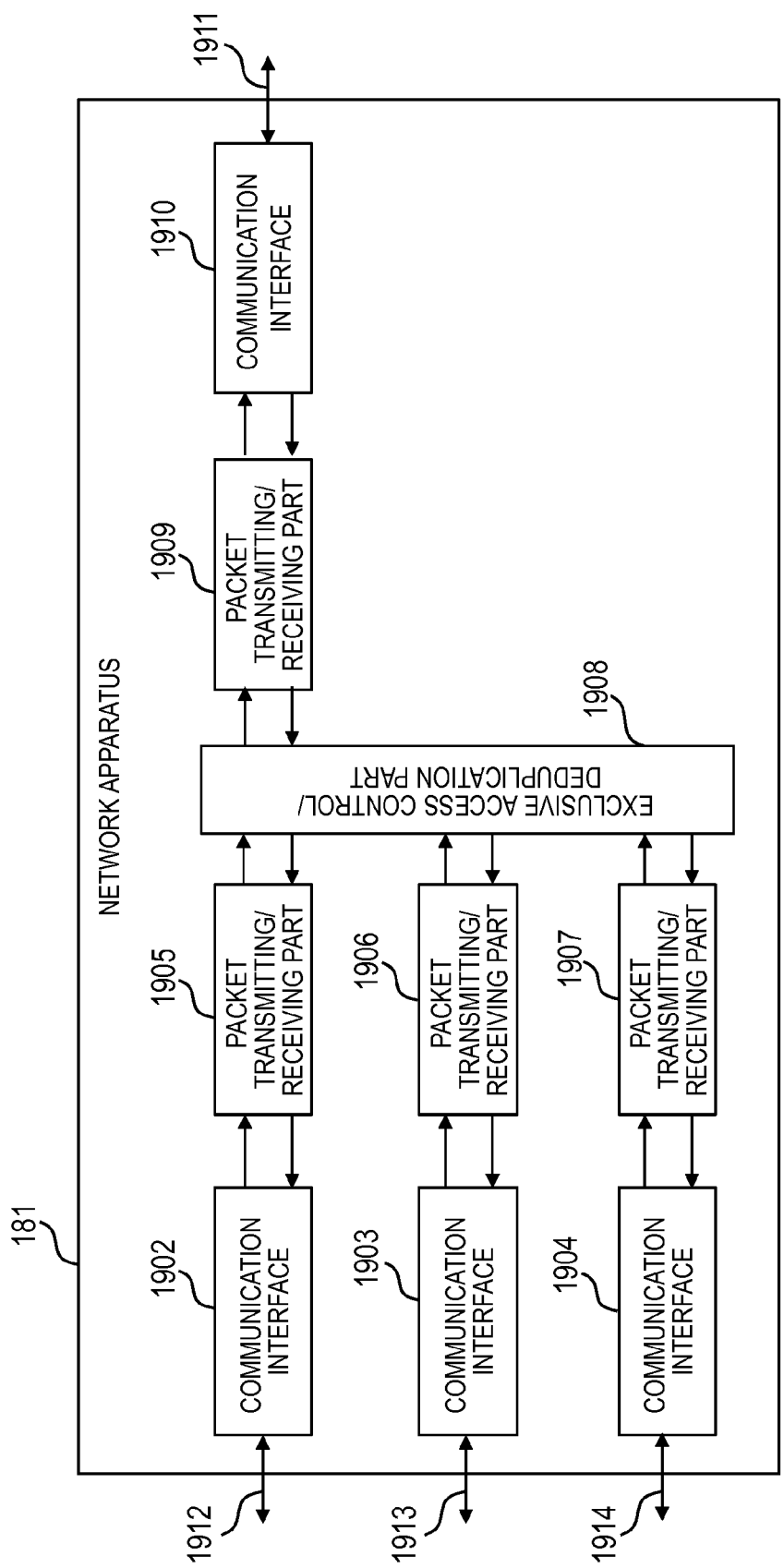
FIG. 17 is an explanatory diagram of a configuration of a network apparatus according to the third embodiment of this invention.

FIG. 17 is an explanatory diagram of the configuration of the network apparatus 181 according to the third embodiment of this invention.

The network apparatus 181 is coupled to the wide area networks 405 side via communication paths 1912 to 1914, and is connected to the time slave 13 via a communication path 1911.

The network apparatus 181 has three communication interfaces 1902 to 1904 and three packet transmitting/receiving parts 1905 to 1907 on the wide area network 405 side, and one communication interface 1910 and one packet transmitting/receiving part 1909 on the time slave 13 side.

In the network apparatus 181, the packet transmitting/receiving parts 1905 to 1907 on the wide area network 405 side and the packet transmitting/receiving part 1909 on the time slave 13 side are connected to each other via an exclusive access control/deduplication part 1908.

The exclusive access control/deduplication part 1908 has a function of performing exclusive access control over a plurality of received packets and thereby communicating a desired packet which is selected from among the plurality of packets, and a function of performing deduplication on a plurality of packets and thereby communicating a plurality of received packets from which duplicate packets have been removed.

Figure 18:
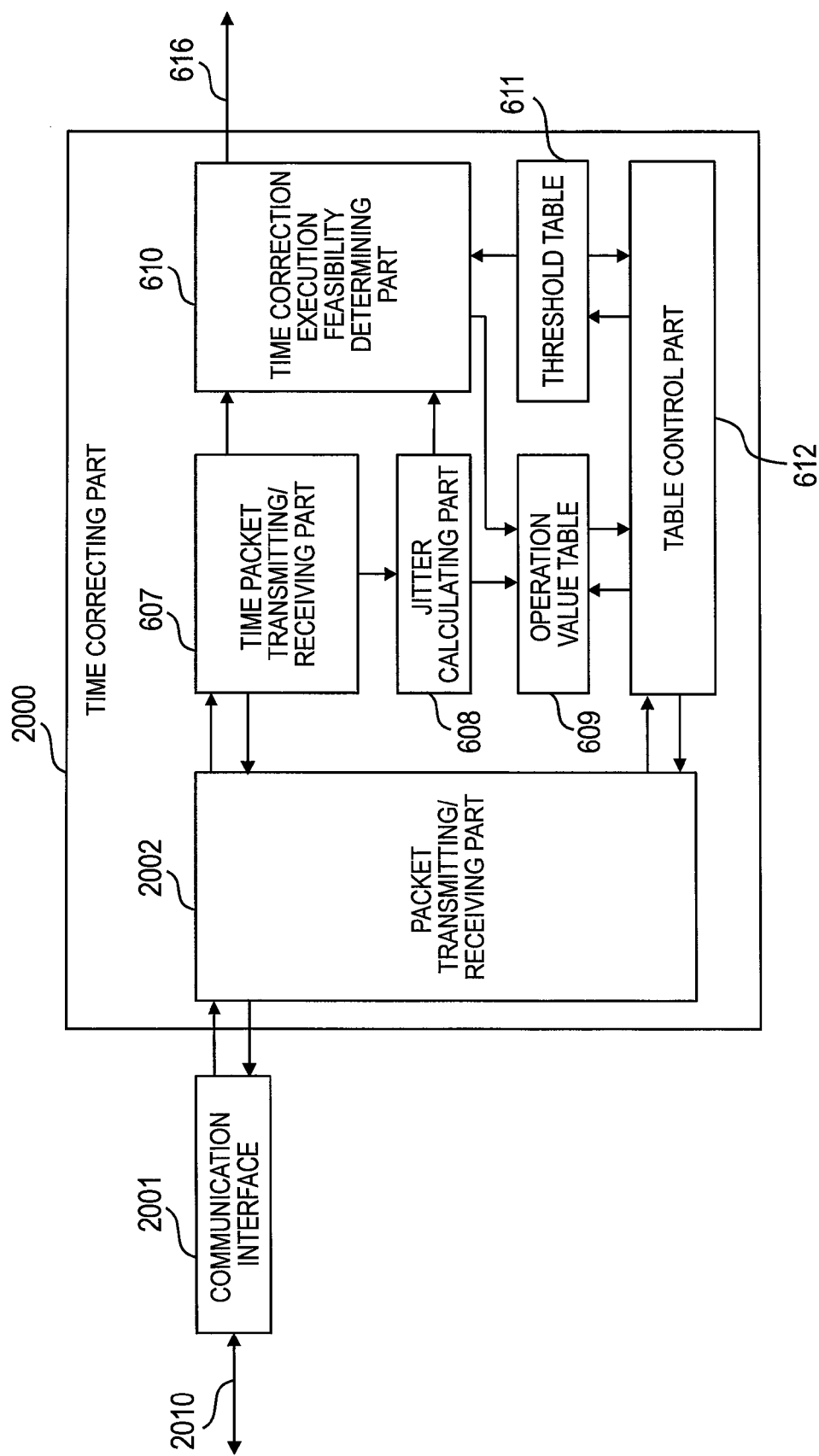
FIG. 18 is an explanatory diagram of the configuration of the time correcting part according to the third embodiment of this invention.
Figure 19:
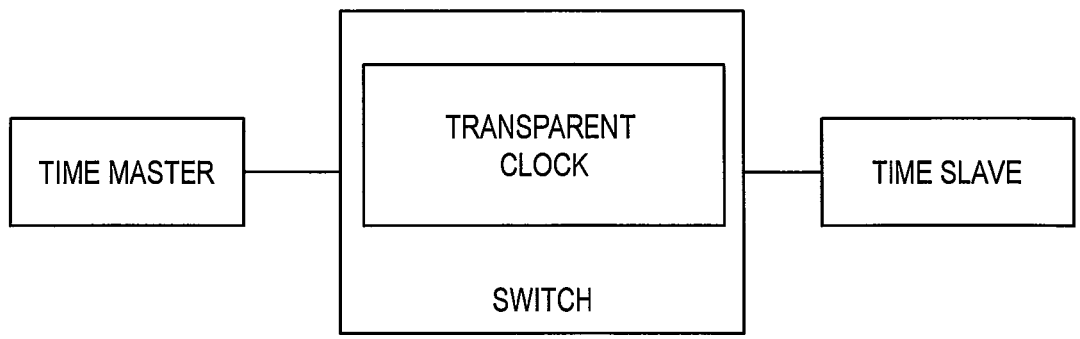
FIG. 19 is an explanatory diagram of a basic principle of IEEE 1588 v2.

FIG. 18 is an explanatory diagram of the configuration of a time correcting part 2000 according to the third embodiment of this invention. Components of the time correcting part 2000 of this embodiment that are the same as those of the time correcting part 50 of the first embodiment illustrated in FIG. 3 and the time correcting part 1600 of the second embodiment illustrated in FIG. 14 are denoted by the same reference symbols, and descriptions thereof are omitted.

The time slave 13 has the communication interface 2001, which is connected to a communication path 2010 leading to the network apparatus 181. The time correcting part 2000 includes the packet transmitting/receiving part 2002, which is connected to the communication interface 2001 to transmit/receive packets to/from the network apparatus 181.

This embodiment has a feature in that one communication path 2010, one communication interface 2001, and one packet transmitting/receiving part 2002 are provided, as opposed to a plurality of communication paths 2010, a plurality of communication interfaces 2001, and a plurality of packet transmitting/receiving parts 2002. The communication interface 2001 communicates information to/from the time master 10 and the management node 402. The packet transmitting/receiving part 2002 passes a received packet to the time packet transmitting/receiving part 607 when the received packet is information from the time master 10, and passes a received packet to the table control part 612 when the received packet is information from the management node 402.

The packet transmitting/receiving part 2002 can identify from which network a packet has been received because the communication interfaces 1902 to 1904 or packet transmitting/receiving parts 1905 to 1907 of the network apparatus 181 assign their own identifiers to received packets, and the packet transmitting/receiving part 1909 and the communication interface 1910 transmit the packets with the identifiers assigned.

The rest of the configuration of the time correcting part 2000 is the same as that of the time correcting part 50 of the first embodiment and the time correcting part 1600 of the second embodiment.

As has been described, according to the present invention, the time slave 13 can detect in a reduced time switching of the wide area network 405 that is used by the time master 10 for the transmission of a time packet, and a right determination can be made about whether to correct time even immediately after the switching of the wide area network 405.

This invention is optimum for, for example, a power system stabilization system that utilizes a data center, where a charge station, a photovoltaic power generating system, power distribution equipment for controlling system stabilization, and others are located geographically dispersedly. These facilities are coupled to the data center via a network, and the data center collects data from customer-side bases of the respective facilities and performs information processing on the collected data. In a system as this, a redundant network is provided in order to enhance the reliability of communication networks, and a right determination about whether to correct time needs to be made also when the network to use is switched. This invention is therefore optimum for this and similar systems.

In addition, the management node 402 in this invention determines for each time slave 13 the propriety of the threshold based on actual values that are related to a time packet received by the time slave 13, and changes the threshold when the threshold is not appropriate.

This guarantees the propriety of the threshold of the time slave 13 so that an accurate time correction can be executed.

This invention is not limited to the embodiments described above and encompasses various modification examples. For instance, the embodiments given above are detailed descriptions intended for easier understanding of this invention, and this invention is not limited to a mode that has all of the components described above. To give another example, while one time slave is provided in one base in the time synchronization systems according to the embodiments described above, it should be understood that this invention is applicable also to a configuration in which one base is provided with a plurality of time slaves.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the above-mentioned functions. Programs, tables, files, and other types of information for implementing the above-mentioned functions can be put in a memory, a recording device such as a hard disk or a solid state drive (SSD), or a recording medium such as an IC card, an SD card, or a DVD.

What is claimed is:

1. A time synchronization system, comprising:
a time master, a time slave, and a management node which are coupled to one another via a plurality of networks,
wherein the time master transmits to the time slave a first time packet at a given timing through at least one network of the plurality of networks,
wherein the time slave includes a first processor connected to a first memory that stores threshold information in which a plurality of thresholds are registered for each of the plurality of networks,
wherein the first memory further stores instructions that, when executed by the first processor, causes the first processor to execute:
a time correction execution feasibility determining part for receiving, through the at least one network of the plurality of networks, the first time packet transmitted from the time master and for determining whether to execute time correction by comparing jitters calculated based on the received first time packet and the thresholds registered for the at least one network,
a time correcting part for correcting, when the time correction execution feasibility determines that the calculated jitters are less than the thresholds registered for the at least one network, a time value based on the received first time packet, and
wherein the management node includes a second processor connected to a second memory that stores instructions that, when executed by the second processor, causes the second processor to execute:
a network switching determining part for determining to switch the at least one network through which the first time packet is transmitted to at least one other different network of the plurality of networks when a failure is detected in the at least one network through which the first time packet is transmitted, and a network switching notifying part for notifying, when the failure is detected in the at least one network, information for identifying the at least one other different network to the time slave, and wherein the time master transmits to the time slave a second time packet through the at least one other different network after the time slave is notified by the network switching notifying part.

2. The time synchronization system according to claim 1, wherein the second memory further stores instructions that, when executed by the second processor, causes the second processor to execute:

a threshold change determining part for determining whether to change the thresholds stored in the time slave, wherein the time slave stores operation values that are used by the threshold change determining part to calculate the litters.

3. The time synchronization system according to claim 2, wherein the first memory further stores instructions that, when executed by the first processor, causes the first processor to:

determine whether or not one of the operation values meets a given condition; and notify, in a case where it is determined that the one of the operation values meets the given condition, the threshold change determining part of the fact, and wherein, in a case of being notified of the fact that the one of the operation values meets the given condition, the threshold change determining part obtains the operation values and determines, based on the obtained operation value, whether to change the thresholds.

4. The time synchronization system according to claim 2, wherein the first memory further stores instructions that, when executed by the first processor, causes the first processor to execute:

a delay calculating part for calculating a network delay value of the received first time packet, and wherein the time slave stores, as one of the operation values, the network delay value calculated by the delay calculating part.

5. The time synchronization system according to claim 2, wherein the time slave stores, as one of the operation values, a count that indicates how many times the time correction execution feasibility determining part has determined that time correction is not to be executed.

6. The time synchronization system according to claim 1, wherein the first memory further stores instructions that, when executed by the first processor, causes the first processor to execute:

a delay calculating part for calculating mean delay and the jitters include a mean jitter and a jitter standard deviation based on the received first time packet.

7. The time synchronization system according to claim 6, wherein the threshold information includes information for identifying the at least one network through which the time master transmits the first time packet, and wherein, when notified of the information for identifying the at least one other different network, the time slave updates the threshold information so that the at least one other different network is indicated as transmitting the second time packet from the time master.

8. The time synchronization system according to claim 6, wherein the time correction execution feasibility determining part is configured to:

determine, in a case where the mean delay that is calculated by the delay calculating part is within the one of the thresholds, whether or not the mean delay that is calculated by the delay calculating part is a smallest among the plurality of networks; and determine that the time correction is to be executed in a case where it is determined that the mean delay that is calculated by the delay calculating part is the smallest among the plurality of networks.

9. The time synchronization system according to claim 1, further comprising:

a network apparatus which is provided between the time slave and the plurality of networks to relay the first time packet from the plurality of networks to the time slave, wherein the network apparatus includes a third processor connected to a third memory stores instructions that, when executed by the third processor, causes the third processor to execute:

a plurality of time packet receiving parts respectively provided for each of the plurality of networks, and a time packet transmitting part for transmitting the received first time packet to the time slave, wherein, when one of the packet receiving parts receives the first time packet, the one of the packet receiving parts includes a respective identifier in the first time packet, and the time packet transmitting part transmits the received first time packet, that includes the respective identifier of the one of the packet receiving parts, to the time slave.

10. A time synchronization method to be performed in a time synchronization system having a time master, a time slave, and a management node which are coupled to one another via a plurality of networks, the time synchronization method including:

storing, by the time slave, threshold information in which a plurality of thresholds are registered for each of the plurality of networks;

transmitting, by the time master, to the time slave a first time packet at a given timing through at least one network of the plurality of networks;

receiving, by the time slave, through the at least one network, the first time packet transmitted from the time master and determining, in reference to the threshold information, whether to execute time correction by comparing jitters calculated based on the received first time packet and the thresholds registered for the at least one network;

correcting, when it is determined that the calculated jitters are less than the thresholds registered for the at least one network, a time value at the time slave based on the received first time packet;

determining, by the management node, to switch the at least one network through which the first time packet is transmitted to at least one other different network of the plurality of networks when a failure is detected in the at least one network through which the first time packet is transmitted;

notifying, by the management node, when the failure is detected in the at least one network, information for identifying the at least one other different network to the time slave; and transmitting, by the time master, to the time slave a second time packet through the at least one other different network after the time slave is notified.

* * * * *